(12) United States Patent
Subbu et al.

(45) Date of Patent: Dec. 10, 2013

(10) Patent No.: US 8,606,491 B2

(54) METHODS AND SYSTEMS FOR MANAGING AIR TRAFFIC

(75) Inventors: Rajesh Venkat Subbu, Clifton Park, NY (US); Feng Xue, Clifton Park, NY (US); Mauricio Castillo-Effen, Rexford, NY (US); Joel Kenneth Klooster, Grand Rapids, MI (US); Joachim Karl Hochwarth, Grand Rapids, MI (US); Sergio Torres, Bethesda, MD (US); Weiwei Chen, Guilderland, NY (US)

(73) Assignee: General Electric Company, Niskayuna, NY (US)

( * ) Notice: Subject to any disclaimer, the term of this patent is extended or adjusted under 35 U.S.C. 154(b) by 425 days.

(21) Appl. No.: 13/032,101

(22) Filed: Feb. 22, 2011

(65) Prior Publication Data
US 2012/0215433 A1 Aug. 23, 2012

(51) Int. Cl.
*G08G 5/00* (2006.01)
*G08G 5/04* (2006.01)

(52) U.S. Cl.
CPC .................................. *G08G 5/0043* (2013.01)
USPC ........... 701/120; 701/121; 701/122; 701/300; 701/301; 701/302; 340/961; 342/36; 342/104; 342/118; 342/147

(58) Field of Classification Search
None
See application file for complete search history.

(56) References Cited

U.S. PATENT DOCUMENTS

| 5,047,946 | A | * | 9/1991 | King et al. ..................... 701/467 |
| 5,340,061 | A | * | 8/1994 | Vaquier et al. ................ 244/175 |
| 5,961,568 | A | * | 10/1999 | Farahat .......................... 701/120 |
| 6,020,831 | A | * | 2/2000 | Nishida et al. ................. 340/945 |
| 6,314,362 | B1 | * | 11/2001 | Erzberger et al. ............. 701/120 |
| 6,393,358 | B1 | * | 5/2002 | Erzberger et al. ............. 701/120 |
| 6,463,383 | B1 | | 10/2002 | Baiada et al. |
| 6,584,400 | B2 | * | 6/2003 | Beardsworth ................. 701/120 |
| 6,721,714 | B1 | | 4/2004 | Baiada et al. |
| 6,789,011 | B2 | | 9/2004 | Baiada et al. |
| 6,873,903 | B2 | | 3/2005 | Baiada et al. |

(Continued)

FOREIGN PATENT DOCUMENTS

| EP | 2071542 | 12/2010 |
| GB | 2404468 | 2/2005 |
| WO | 2009042405 | 4/2009 |

OTHER PUBLICATIONS

Eurocontrol, ADAPT2 Aircraft Data Aiming at Predicting the Trajectory, Data analysis report, Issued Dec. 2009.

(Continued)

*Primary Examiner* — Jonathan M Dager
(74) *Attorney, Agent, or Firm* — John P. Darling

(57) ABSTRACT

Methods and systems suitable for negotiating air traffic trajectory modification requests received from multiple aircraft that each has trajectory parameters. The methods include transmitting from at least a first aircraft a first trajectory modification request to alter the altitude, speed and/or lateral route thereof. A first conflict assessment is then performed to determine if the first trajectory modification request poses a conflict with the altitudes, speeds and lateral routes of other aircraft. If a conflict is not identified, the first trajectory modification request is granted and the first aircraft is notified of the first trajectory modification request being granted. Alternatively, if a conflict is identified, the first trajectory modification request is not granted and the first aircraft is notified thereof. If the first trajectory modification request was not granted, the first trajectory modification request is placed in a queue, which is periodically processed to perform subsequent conflict assessments.

22 Claims, 15 Drawing Sheets

(56) References Cited

U.S. PATENT DOCUMENTS

| | | | |
|---|---|---|---|
| 7,248,949 B2 | 7/2007 | Love et al. | |
| 7,248,963 B2 | 7/2007 | Baiada et al. | |
| 7,333,887 B2 | 2/2008 | Baiada et al. | |
| 7,457,690 B2 | 11/2008 | Wilson et al. | |
| 7,788,027 B2 | 8/2010 | Jones | |
| 7,877,197 B2 | 1/2011 | Lewis et al. | |
| 8,185,298 B2 * | 5/2012 | Jha et al. | 701/121 |
| 8,321,069 B2 * | 11/2012 | Vasek et al. | 701/3 |
| 8,463,535 B2 * | 6/2013 | Torres et al. | 701/120 |
| 2003/0078719 A1 * | 4/2003 | Zobell et al. | 701/120 |
| 2004/0024527 A1 * | 2/2004 | Patera | 701/301 |
| 2004/0024528 A1 * | 2/2004 | Patera et al. | 701/301 |
| 2004/0039518 A1 * | 2/2004 | Jasselin | 701/120 |
| 2005/0156777 A1 * | 7/2005 | King et al. | 342/29 |
| 2005/0216140 A1 * | 9/2005 | Bouchet | 701/3 |
| 2005/0261808 A1 * | 11/2005 | Artini et al. | 701/3 |
| 2006/0089760 A1 * | 4/2006 | Love et al. | 701/4 |
| 2006/0224318 A1 | 10/2006 | Wilson, Jr. et al. | |
| 2007/0100538 A1 * | 5/2007 | Wise et al. | 701/200 |
| 2008/0288164 A1 * | 11/2008 | Lewis et al. | 701/120 |
| 2010/0049382 A1 | 2/2010 | Akalinli et al. | |
| 2010/0131124 A1 * | 5/2010 | Klooster | 701/3 |
| 2010/0153875 A1 * | 6/2010 | O'Flynn et al. | 715/786 |
| 2012/0215434 A1 * | 8/2012 | Subbu et al. | 701/120 |
| 2012/0215435 A1 * | 8/2012 | Subbu et al. | 701/120 |
| 2012/0245834 A1 * | 9/2012 | Klooster et al. | 701/120 |
| 2012/0253649 A1 * | 10/2012 | McGuffin | 701/120 |
| 2013/0085661 A1 * | 4/2013 | Chan et al. | 701/122 |

OTHER PUBLICATIONS

Adan E. Vela and Senay Solak; Eric Feron, Karen Feign, and William Singhose; "A Fuel Optimal and Reduced Controller Workload Optimization Model for Conflict Resolution", 08/09, 978-1-4244-4078, 2009.

Iab Wilson, "Trajectory Negotiation in a Multi-sector Environment", EuroControl, Bruxelles, Doc 97-70-14, Jun. 1998.

Daniel B. Kirk, Karen C. Bowen, Winfield S. Heagy, Nicholas E. Rozen, Karen J. Viets; "Development and Assessment of Problem Resolution Capabilities for the En Route Sector Controller"; The Mitre Corporation; American Institute of Aeronautics and Astronautics, AIAA-2001-5255, May 2001.

John P. Wangermann and Robert F. Stengel; "Optimization and Coordination of Multiagent Systems Using Principled Negotiation"; Journal of Guidance, Control and Dynamics, vol. 22, No. 1, Jan.-Feb. 1999.

Eric Mueller, Sandy Lozito; "Flight Deck Procedural Guidelines for Datalink Trajectory Negotiation"; American Institute of Aeronautics and Astronautics, Sep. 2008.

NextGen Avionics Roadmap; Joint Planning and Development Office, Version 1.0, Oct. 24, 2008.

Richard A. Coppenbarger, Richard Lanier, Doug Sweet and Susan Dorsky; "Design and Development of the En Route Descent Advisor (EDA) for Conflict-Free Arrival Metering"; American Institute of Aeronautics and Astronautics, Aug. 2004.

Rich Coppenbarger; "Trajectory Negotiation & En Route Data Exchange DAG CE-6"; DAG Workshop, May 22-24, 2000.

Joel Klooster, Sergio Torres, Daniel Earman, Mauricio-Castillo-Effen, Raj Subbu, Leonardo Kammer, David Chan, Tom Tomlinson; "Trajectory Synchronization and Negotiation in Trajectory Based Operations", Oct. 2010.

Steven M. Green, Dr. Tsuyoshi Goka, David H. Williams; "Enabling User Preferences Through Data Exchange", Aug. 1996.

Dr. Daniel B. Kirk, Winfield S. Heagy, Alvin L. McFarland, Michael J. Yablonski; "Preliminary Observations About Providing Problem Resolution Advisories to Air Traffic Controllers"; The MITRE Corporation, 2000.

Daniel B. Kirk, "Enhanced Trial Planning and Problem Resolution Tools to Support Free Flight Operations"; Aug. 2000; Project No. 02001301-U1; MITRE Paper.

Daniel B. Kirk, Winfield S. Heagy, and Michael J. Yablonski; "Problem Resolution Support for Free Flight Operations"; IEEE Transactions on Intelligent Transportation Systems, vol. 2, No. 2, Jun. 2001.

Daniel B. Kirk, Karen C. Bowen, Winfield S. Heagy, Nicholas E. Rozen, Karen J. Viets; "Problem Analysis, Resolution and Ranking (PARR) Development and Assessment"; The MITRE Corporation; 4th USA/Europe Air Traffic Management R&D Seminar, Dec. 3-7, 2001.

Paul U. Lee, Jean-Francois D'Arcy, Paul Mafera, Nancy Smith, Vernol Battiste, Walter Johnson, Joey Mercer, Everett A. Palmer, Thomas Prevot; "Trajectory Negotiation via Data Link: Evaluation of Human-in-the-loop Simulation", 2004.

Marcus B. Lowther, Dr. John-Paul B. Clarke, and Dr. Liling Ren; "En Route Speed Change Optimization for Spacing Continuous Descent Arrivals"; AGIFORS Student Paper Submission, 2007.

Joint Planning and Development Office, Concept of Operations for the Next Generation Air Transportation System, Version 2.0, Jun. 13, 2007.

Liling Ren and John-Paul B. Clarke; "Separation Analysis Methodology for Designing Area Navigation Arrival Procedures"; Journal of Guidance, Control, and Dynamics; vol. 30, No. 5, Sep.-Oct. 2007.

Liling Ren and John-Paul B. Clarke; "Flight-Test Evaluation of the Tool for Analysis of Separation and Throughput"; Journal of Aircraft; vol. 45, No. 1, Jan.-Feb. 2008.

G. J. Couluris; "Detailed Description for CE6 En route Trajectory Negotiation"; Technical Research in Advanced Air Transportation Technologies; Nov. 2000; NAS2-98005 RTO-41.

Harry N. Swenson, Ty Hoang, Shawn Engelland, Danny Vincent, Tommy Sanders, Beverly Sanford, Karen Heere; "Design and Operational Evaluation of the Traffic Management Advisory at the Fort Worth Air Route Traffic Control Center"; 1st USA/Europe Air Traffic Management Research Development Seminar; France, Jun. 17-19, 1997.

* cited by examiner

METHODS AND SYSTEMS FOR MANAGING AIR TRAFFIC

BACKGROUND OF THE INVENTION

The present invention generally relates to methods and systems for managing air traffic. More particularly, aspects of this invention include methods and systems for negotiating and processing air traffic trajectory modification requests received from multiple aircraft, and methods and systems for scheduling air traffic arriving at airports.

Trajectory Based Operations (TBO) is a key component of both the US Next Generation Air Transport System (NextGen) and Europe's Single European Sky ATM Research (SESAR). There is a significant amount of effort underway in both programs to advance this concept. Aircraft trajectory synchronization and trajectory negotiation are key capabilities in existing TBO concepts, and provide the framework to improve the efficiency of airspace operations. Trajectory synchronization and negotiation implemented in TBO also enable airspace users (including flight operators (airlines), flight dispatchers, flight deck personnel, Unmanned Aerial Systems, and military users) to regularly fly trajectories close to their preferred (user-preferred) trajectories, enabling business objectives, including fuel and time savings, wind-optimal routing, and direction to go around weather cells, to be incorporated into TBO concepts. As such, there is a desire to generate technologies that support trajectory synchronization and negotiation, which in turn are able to facilitate and accelerate the adoption of TBO.

As used herein, the trajectory of an aircraft is a time-ordered sequence of three-dimensional positions an aircraft follows from takeoff to landing, and can be described mathematically by a time-ordered set of trajectory vectors. In contrast, the flight plan of an aircraft will be referred to as documents that are filed by a pilot or a flight dispatcher with the local civil aviation authority prior to departure, and include such information as departure and arrival points, estimated time en route, and other general information that can be used by air traffic control (ATC) to provide tracking and routing services. Included in the concept of flight trajectory is that there is a trajectory path having a centerline, and position and time uncertainties surrounding this centerline. Trajectory synchronization may be defined as a process of resolving discrepancies between different representations of an aircraft's trajectory, such that any remaining differences are operationally insignificant. What constitutes an operationally insignificant difference depends on the intended use of the trajectory. Relatively larger differences may be acceptable for strategic demand estimates, whereas the differences must be much smaller for use in tactical separation management. An overarching goal of TBO is to reduce the uncertainty associated with the prediction of an aircraft's future location through use of an accurate four-dimensional trajectory (4DT) in space (latitude, longitude, altitude) and time. The use of precise 4DTs has the ability to dramatically reduce the uncertainty of an aircraft's future flight path in terms of the ability to predict the aircraft's future spatial position (latitude, longitude, and altitude) relative to time, including the ability to predict arrival times at a geographic location (referred to as metering fix, metering fix, arrival fix, or cornerpost) for a group of aircraft that are approaching their arrival airport. Such a capability represents a significant change from the present "clearance-based control" approach (which depends on observations of an aircraft's current state) to a trajectory-based control approach, with the goal of allowing an aircraft to fly along a user-preferred trajectory. Thus, a critical enabler for TBO is the availability of an accurate, planned trajectory (or possibly multiple trajectories), providing ATC with valuable information to allow more effective use of airspace.

Generally, trajectory negotiation is a process by which information is exchanged to balance the user preferences with safety, capacity and business objectives and constraints of operators or Air Navigation Service Providers (ANSPs). Although trajectory negotiation is a key component of existing TBO concepts, there are many different viewpoints on what trajectory negotiation is and involves. Depending on the time-frame and the desired outcome of the negotiation, different actors will be involved in the negotiation, and different information will be exchanged. Generally, the concept of trajectory negotiation has been described as an aircraft operator's desire to negotiate an optimal or preferred trajectory, balanced with the desire to ensure safe separation of aircraft and optimal sequencing of those aircraft during departure and arrival, while providing a framework of equity. Trajectory negotiation concepts also allow for airspace users to submit trajectory preferences to resolve conflicts, including proposed modifications to an aircraft's 4D trajectory (lateral route, altitude and speed).

In view of the above, TBO concepts require the generation, negotiation, communication, and management of 4DTs from individual aircraft and aggregate flows representing the trajectories of multiple aircraft within a given airspace. Trajectory management of multiple aircraft can be most reliably achieved through automated assistance to negotiate pilot trajectory change requests with properly equipped aircraft operators, allowing for the negotiation of four-dimensional trajectories between the pilot/operator of an aircraft and the ANSP. Trajectory negotiation has been described as having four phases: pre-negotiation, negotiation, agreement, and execution. See, for example, Joint Planning and Development Office, October, 2008, NextGen Avionics Roadmap, Version 1. In pre-negotiation, the user-preferred trajectories of all relevant aircraft are known or inferred by an air traffic management (ATM) system. Any conflicts between these user-preferred trajectories or with airspace constraints leads to the negotiation phase. In this phase, modifications to one or more user-preferred trajectories may be negotiated between the flight operator and the ANSP to make best of use of the airspace from the ANSP perspective while minimizing the deviation from the operator's objectives for that flight. The agreement phase results in a negotiated 4DT for the aircraft, at least a portion of which is cleared by the ANSP. In the execution phase, the aircraft flies the agreed and cleared 4DT, and the ANSP monitors adherence to this 4DT. Failure of an aircraft to adhere to the negotiated trajectory, or changes in circumstances (for example, an emergency situation or pop-up flight) can result in reinitiation of the negotiation phase. For use in the negotiation and agreement phases, several air-ground communication protocols and avionics performance standards exist or are under development, for example, controller pilot data link communication (CPDLC) and automatic dependant surveillance-contract (ADSC) technologies.

Related to concepts of air traffic management are various types of Arrival Managers (AMAN) known in the art, non-limiting examples of which include systems known as Traffic Management Advisor (TMA) and En-Route Decent Advisor (EDA), which are part of the National Aeronautics and Space Administration's (NASA) Center-TRACON Automation System (CTAS) currently under development. TMA is discussed in H. N. Swenson et al., "Design and Operational Evaluation of the Traffic Management Advisor at the Fort Worth Air Route Traffic Control Center," 1st USA/Europe Air Traffic Management Research & Development Seminar, Saclay, France (Jun. 17-19, 1997), and EDA is discussed in R. A. Coppenbarger et al., "Design and Development of the En Route Descent Advisor (EDA) for Conflict-Free Arrival Metering," Proceedings of the AIAA Guidance, Navigation, and Control Conference (2004). The primary goal of TMA is to schedule arrivals by assigning to each aircraft a scheduled time-of-arrival (STA) at metering fixes. TMA computes the delay needed as the difference between the STA and the estimated time-of-arrival (ETA). The primary goal of EDA is to compute advisories for air traffic controllers (ATCo) to help deliver aircraft to an arrival-metering fix in conformance with STAs, while preventing separation conflicts with other aircraft along the arrival trajectory. EDA primarily makes use of speed adjustments and then, if necessary, adds lateral distance to absorb more delay via path stretches. EDA also incorporates conflict detection and conflict resolution through simultaneous adjustments to both cruise and decent speeds. However, user preferences are not incorporated into the EDA concept.

Several significant gaps remain in implementing TBO, due in part to the lack of validation activities and benefits assessments. In response, the General Electric Company and the Lockheed Martin Corporation have created a Joint Strategic Research Initiative (JSRI), which aims to generate technologies that accelerate adoption of TBO in the Air Traffic Management (ATM) realm. Efforts of the JSRI have included the use of GE's Flight Management System (FMS) and aircraft expertise, Lockheed Martin's ATC domain expertise, including the En Route Automation Modernization (ERAM) and the Common Automated Radar Terminal System (Common ARTS), to explore and evaluate trajectory negotiation and synchronization concepts. Ground automation systems typically provide a four-dimensional trajectory model capable of predicting the paths of aircraft in time and space, providing information that is required for planning and performing critical air traffic control and traffic flow management functions, such as scheduling, conflict prediction, separation management and conformance monitoring. On board an aircraft, the FMS can use a trajectory for closed-loop guidance by way of the automatic flight control system (AFCS) of the aircraft. Many modern FMSs are also capable of meeting a required time-of-arrival (RTA), which may be assigned to an aircraft by ground systems.

Notwithstanding the above technological capabilities, questions remain related to the trajectory negotiation process, including the manner in which parameters and constraints are exchanged that affect the 4D trajectories of a group of aircraft in a given air space, and how to arrive at negotiated trajectories that are as close to user-preferred trajectories (in terms of business objectives) as possible while fully honoring all ATC objectives (safe separation, traffic flow, etc.).

BRIEF DESCRIPTION OF THE INVENTION

The present invention provides a method and system suitable for negotiating air traffic trajectory modification requests received from multiple aircraft that each has trajectory parameters comprising altitude, speed and lateral route thereof.

According to a first aspect of the invention, the method includes transmitting from at least a first aircraft of the multiple aircraft at least a first trajectory modification request to alter the altitude, speed and/or lateral route of the first aircraft. A first conflict assessment is then performed to determine if the first trajectory modification request of the first aircraft poses a conflict with the altitudes, speeds and lateral routes of any other of the multiple aircraft. If a conflict is not identified by the first conflict assessment step, the first trajectory modification request is granted and the first aircraft is notified of the first trajectory modification request being granted. Alternatively, if a conflict is identified by the first conflict assessment step, the first trajectory modification request is not granted and the first aircraft is notified of the first trajectory modification request not being granted. If the first trajectory modification request was granted, the altitude, speed and lateral route of the first aircraft are monitored to assess whether the altitude, speed and lateral route of the first aircraft complies with the first trajectory modification request. If the first trajectory modification request was not granted, the method includes placing the first trajectory modification request in a queue, periodically processing the queue to perform at least one subsequent conflict assessment to determine if the first trajectory modification request of the first aircraft still poses a conflict with the altitudes, speeds and lateral routes of any other of the multiple aircraft, and then granting the first trajectory modification request and notifying the first aircraft of the first trajectory modification request being granted if a conflict is not identified by the subsequent conflict assessment step.

Another aspect of the invention is a system adapted to carry out the method described above.

According to yet another aspect of the invention, a system is provided that includes means for monitoring the altitudes, speeds and lateral routes of the multiple aircraft, means for transmitting at least a first trajectory modification request from at least a first of the multiple aircraft to alter the altitude, speed and/or lateral route thereof, means for performing conflict assessments to determine if the first trajectory modification request transmitted from the first aircraft poses a conflict with the altitudes, speeds and lateral routes of any other of the multiple aircraft, means for notifying the first aircraft if the first trajectory modification request thereof can be granted on the basis of whether a conflict was identified by the conflict assessments performing means, a queue in which the first trajectory modification request is placed if the first trajectory modification request cannot be granted on the basis that a conflict was identified by the conflict assessments performing means, and means for periodically processing the queue to perform subsequent conflict assessments to determine if the first trajectory modification request of the first aircraft still poses a conflict with the altitudes, speeds and lateral routes of any other of the multiple aircraft.

A technical effect of the invention is that preference management can be employed to enable an ATC system to facilitate one or more aircraft flying in a given airspace to achieve user-preferred 4D (altitude, latitude, longitude and time) trajectories (4DTs) during flight, so that operational costs associated with the aircraft (for example, fuel burn, flight time, missed passenger connections, etc.) may be reduced or minimized while ensuring safe separation between all flights in the airspace. Preference management further allows ATC systems to support national airspace-wide fuel savings and reduce delays. Air-ground negotiations associated with this preference management approach also encourages aircraft operators to consider the installation of advanced flight management systems (AFMS) that are capable of supporting air-ground negotiations of the type described above.

Other aspects and advantages of this invention will be better appreciated from the following detailed description.

DETAILED DESCRIPTION OF THE INVENTION

Figure 1:
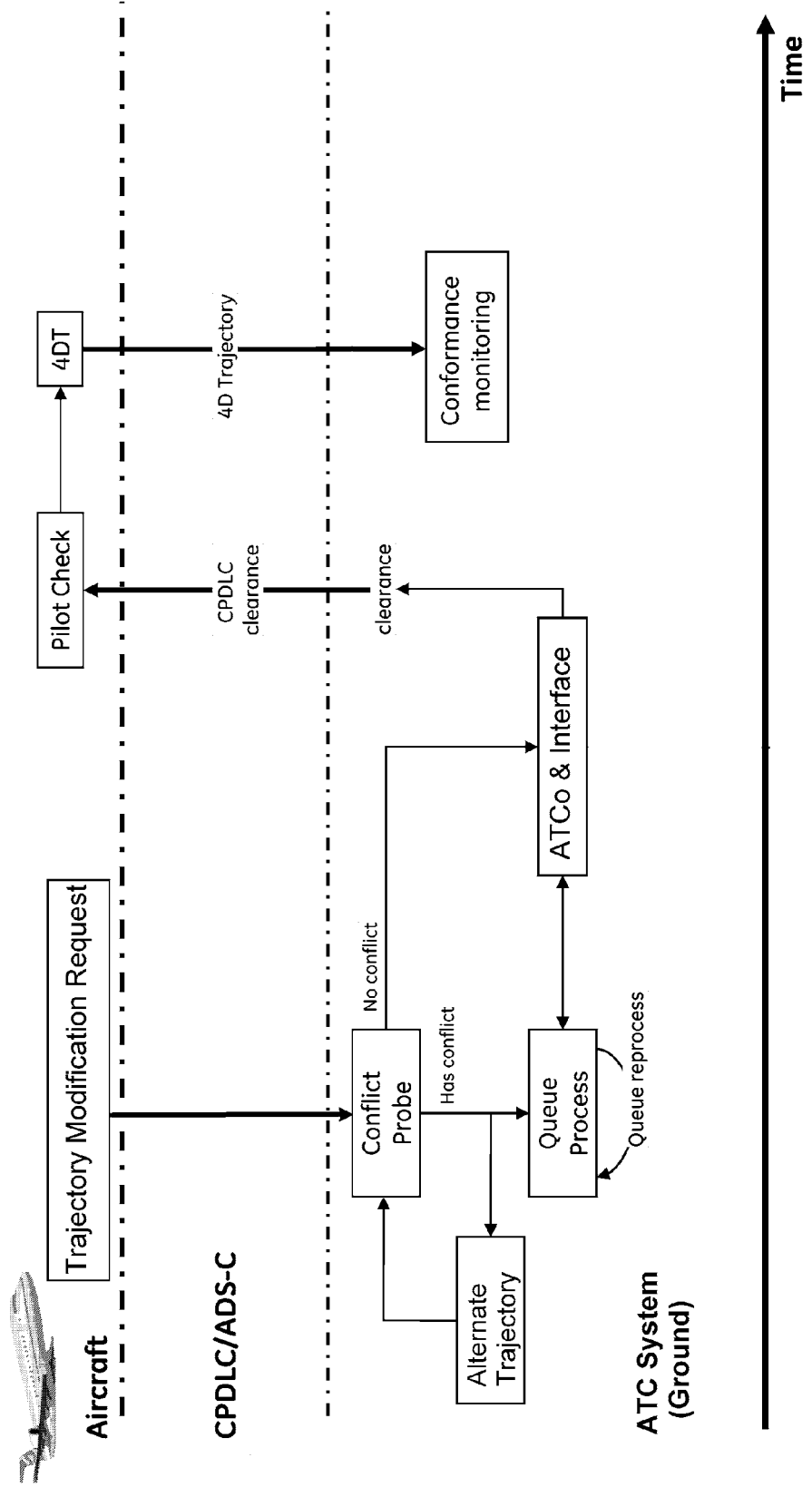
FIG. 1 is a block diagram of a preference management method and system for managing four-dimensional trajectories of aircraft within an airspace in accordance with a first aspect of this invention.

The following discusses various aspects of air traffic management within the scope of this invention. A first of these aspects is referred to as preference management, which involves trajectory negotiations between ground-based air traffic control (ATC) systems and aircraft that allow for modifications in aircraft four-dimensional trajectories (4DTs) to meet business and safety objectives. As used herein, "ATC system" will refer to anyone or any apparatus responsible for monitoring and managing air traffic in a given airspace, including air traffic controllers (ATCo) and the automation they use, and "aircraft" will be used to encompass not only the aircraft itself but also anyone or anything responsible for the planning and altering of the 4D trajectory of the aircraft, including but not limited to flight dispatchers, flight operators (airlines), and flight deck personnel. Hardware and other apparatuses employed by the ATC system are ground-based in order to distinguish the ATC system from hardware on board the aircraft. A second aspect of this invention is referred to as schedule management, involving communications between ATC systems and aircraft to determine trajectory modifications needed to meet an arrival schedule of aircraft within an airspace surrounding an airport. Schedule management also incorporates trajectory negotiations between ATC systems and aircraft so that system preferred time schedules may be met without violating flight safety restrictions while preferably minimizing airspace users' costs. As used herein, a trajectory negotiation will refer to a process, potentially iterative, between an ATC system and an aircraft to arrive at a set of trajectory changes that are acceptable for the aircraft and do not pose conflicts with other aircraft in a given airspace, including the ability to meet operators business objectives while maintaining ANSP safety and schedule needs.

According to the first aspect of the invention, preference management methods and systems are provided to facilitate one or more aircraft flying in a given airspace to achieve user-preferred four-dimensional (altitude, latitude, longitude, time) trajectories (4DT) during flight so that safety objectives can be met and business costs relevant to the aircraft operator can be minimized. Preference management entails trajectory negotiations, which may be initiated by a trajectory modification request from an aircraft, including requests for changes in altitude, lateral route (latitude and longitude), and speed. A nonlimiting example is when an aircraft transmits a trajectory modification request that will enable the aircraft to pass a slower aircraft ahead. Preferences management provides the capability to process International Civil Aviation Organization (ICAO) compliant amendments through the ability to analyze and grant trajectory modification requests. It should also be noted that observations on the ground can initiate a trajectory negotiation, for example, if the paths of a given set of aircraft are in conflict and must be modified for conflict-free flight.

FIG. 1 is a block diagram of the user-preference scenario, and represents an aircraft within an airspace of interest. The preference management method is initiated with the transmission by the aircraft of a trajectory modification request, which may include a cruise altitude change (due to decreasing mass or changing winds) during flight, a lateral (latitude/longitude) route change (for example, a "Direct-To" or weather avoidance re-route), and/or speed change to decrease fuel use or alter the arrival time of the aircraft, for example, to make up for a delay. The aircraft may provide (for example, via digital downlink from the aircraft, a voice request, or a digital exchange from the flight dispatcher) the trajectory modification request to the "Ground," which includes the ATC system and its ATCos, their graphic/user interfaces ("Interface"), and automation ("Conflict Probe" and "Queue Process"). The modification request may be a specific trajectory amendment, for example using a Controller-Pilot Data Link Communications (CPDLC) mechanism which automation of the ATC system converts into a predicted 4DT using supplementary flight plan and state data. Alternatively, the trajectory amendment may be embodied in a proposed alternate trajectory, possibly using existing technologies such as, for example, using an Automatic Dependant Surveillance-Contract (ADS-C). As such, the invention is able to leverage existing standards, such as ADS-C and CPDLC messages defined by the Radio Technical Commission for Aeronautics (RTCA) Special Committee-214 (SC-214), though the air-ground negotiation process of this invention is not limited to such communication formats or controlled times-of-arrival (CTAs).

The ATC system may either choose to manually consider the trajectory modification request (ATCo & Interface), though a preferred aspect of the invention is to delegate the request processing to automation, as represented in FIG. 1. In the order of their receipt, the Conflict Probe of the ATC system compares the 4DTs resulting from the trajectory modification requests to an aggregate of other trajectories for a sub-set or entirety of all known traffic in a given airspace for which the ATC system is responsible. Each comparison identifies any conflicts (for example, a violation of minimum separation between predicted aircraft states correlating to the trajectories, or conflicts relating to airspace congestion or flow) between the resulting 4DT and the 4DTs of all relevant background air traffic, which are maintained in the ATC system. If no conflict is identified, the ATC system may initiate an automatic uplink to the aircraft that its trajectory modification request has been cleared (granted), or may provide the negotiated request and other related clearance information to the ATCo (ATCo & Interface) for further action, including granting or holding the negotiated request. Once the modification request has been noted ("Pilot Check") and implemented ("4DT") by the aircraft, the ATC system monitors the trajectory of the aircraft for conformance to the negotiated modification request. The result of the trajectory negotiation process is preferably a synchronized trajectory that is close to the user-preferred trajectory (in terms of business costs) while honoring all ATC system objectives relating to safe separation, traffic flow, etc.

On the other hand, if the trajectory modification request poses a conflict, the ATC system may place the trajectory modification request in a computer memory data queue for future consideration ("Queue Process"), and then process the next trajectory modification request that had been submitted by a different aircraft. The queuing process involves periodically processing the queue to identify those queued requests that can be granted, for example, because circumstances that had previously resulted in a conflict no longer exist. The aircraft that transmitted the granted requests can then be notified that their requests have been granted, and the granted requests can be cleared from the queue. As will be discussed below in reference to FIG. 4, the queuing process utilizes an optimization algorithm to identify and grant queued requests, preferably in a manner that maximally clears out pending queued requests and guarantees fairness across all airspace users. For example, the queuing process may utilize a combinatorial optimization method, for example, combinatorial heuristics. In order to avoid the queue being overloaded with excessive numbers of requests, the queuing process preferably allows trajectory modification requests to be purged by aircraft request, and trajectory modification requests preferably have a finite time duration within the queue after which they can be purged from the queue.

In addition to utilizing the queue, the ATC system may identify and perform a conflict probe on an alternate trajectory modification request and, if appropriate, propose the alternate trajectory modification to the aircraft if conflict-free. The alternate trajectory modification may be based on information provided from the aircraft relative to the impact (positive or negative) on the flight operator's business objectives of various trajectory changes, such as a lateral distance change, a cruise altitude increase or decrease, or a speed change. This allows an alternative trajectory that may be more preferable than the currently cleared trajectory to be assigned, even if the original (most optimal) request cannot be granted. The aircraft may accept or reject the alternative trajectory modification. If the alternative trajectory modification is rejected by the aircraft, its original trajectory modification request is returned to the queue for subsequent processing. If the alternative trajectory modification is accepted by the aircraft, its original trajectory modification request can be purged from the queue.

Figure 2:
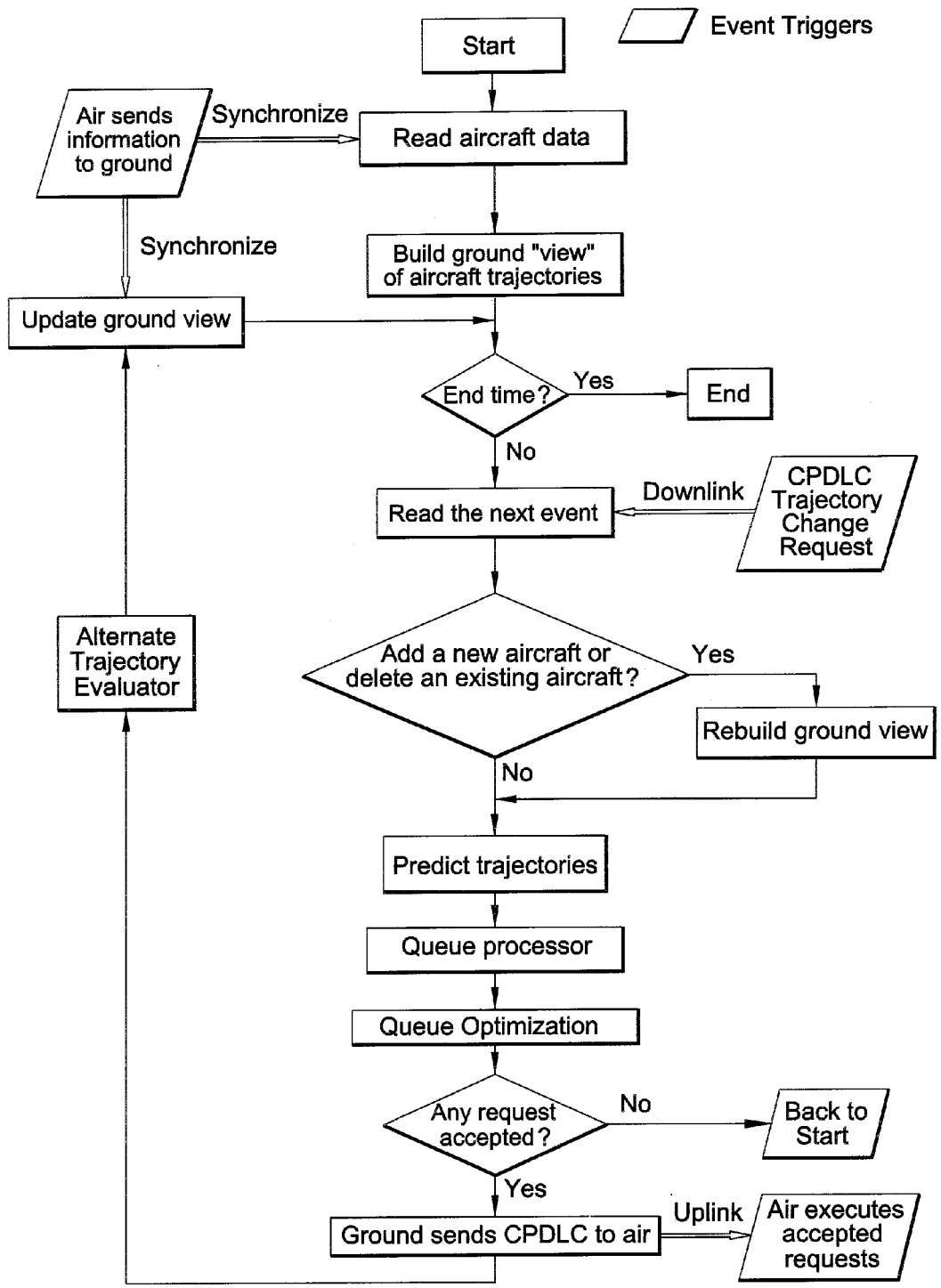
FIG. 2 represents a software information flow diagram suitable for implementing the preference management method of FIG. 1.
Figure 3:
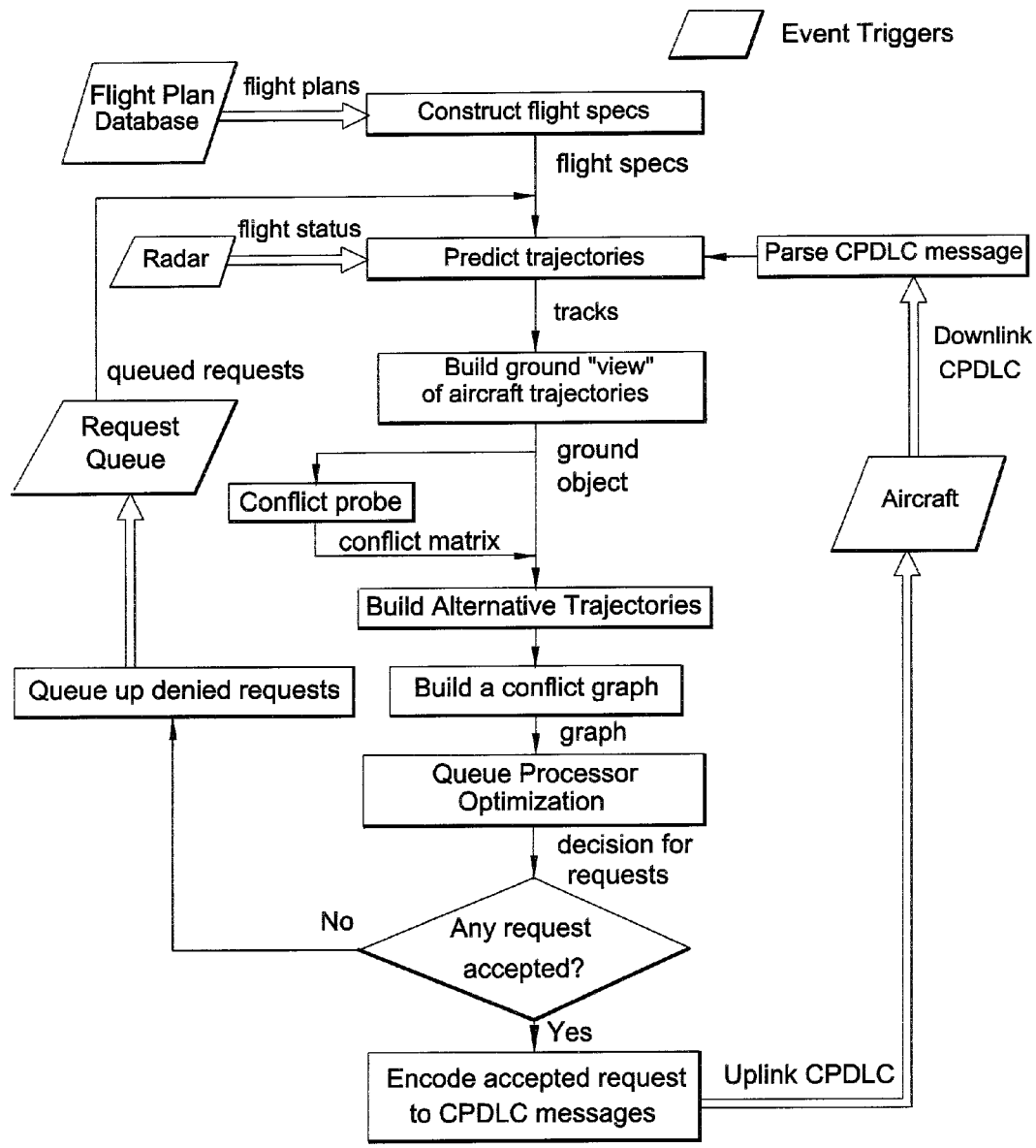
FIG. 3 represents a software module and interface diagram suitable for implementing the preference management method of FIG. 1.
Figure 4:
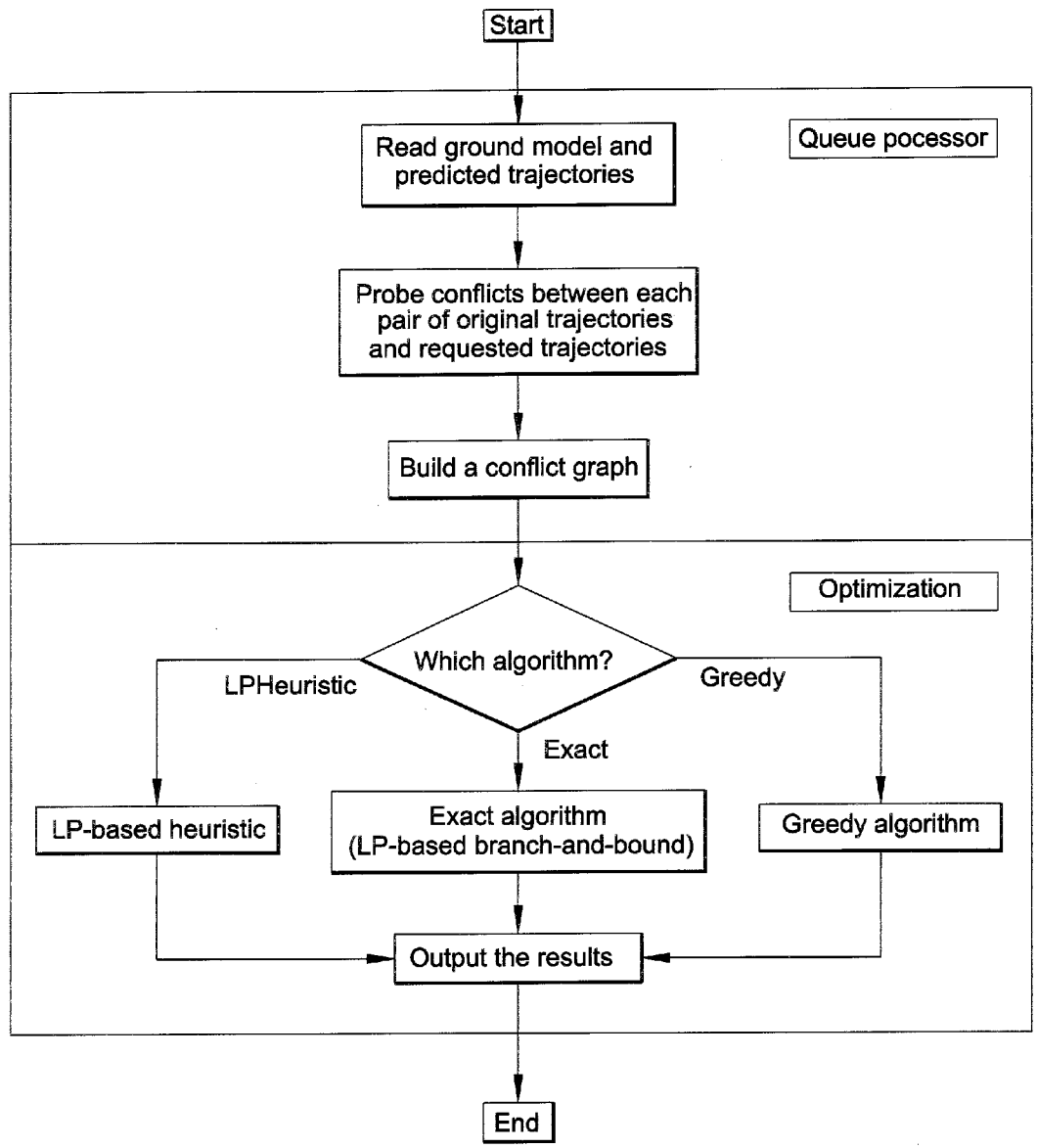
FIG. 4 represents a process flow for the queue processor of FIG. 1 and the queue processor and queue optimization blocks of FIG. 2.

A high-level system software architecture and communications thereof can be carried out on a computer processing apparatus for implementing the preference management method described above. Flow charts of a preferred management module are described in FIGS. 2 and 3. FIG. 2 represents the preferences management software information flow, and FIG. 3 represents the preferences management software modules and interfaces. In FIGS. 2 and 3, the preferences management module reads flight and event data from data storage media of a central controller, which synchronizes the information between air and ground, in a dynamic manner. This information, including trajectory parameters of the aircraft, is updated and stored on the data storage media. The process flow for the queue processor of the preferences management module, including the representation of alternative optimization algorithms, is represented in FIG. 4. The queue processor utilizes predicted trajectories, for example, obtained through a ground automation trajectory predictor, to detect conflicts between existing 4D trajectories of aircraft within the airspace and the 4D trajectory resulting from each trajectory modification request.

The queue process is particularly important in the typical situation in which multiple aircraft occupy the airspace monitored by an ATC system, and two or more of the aircraft desire modifications to their trajectories in order to achieve certain objectives. In existing practice, these preference requests would be either minimally considered or likely denied without further consideration due to the information overload that air traffic controllers typically experience.

Let $T_i$ and $P_i$ be, respectively, the current trajectory and the preferred trajectory for a given aircraft $A_i$, which is one of n aircraft in an airspace monitored by an ATC system. The ideal goal is to potentially achieve a conflict-free trajectory portfolio $\{P_1, P_2, \ldots, P_n\}$, where all $P_i$'s of aircraft requesting trajectory modifications have replaced the $T_i$'s of those aircraft following a conflict probe that does not detect any conflicts. However, this may not be feasible in practice due to potential conflicts, in which case the goal is to identify a portfolio that grants the maximum number of conflict-free preferences and, for example, strive to meet certain business objectives or minimize operational costs (for example, fuel usage) among the aircraft ($A_n$). Such a process may entail considering trajectory portfolios where one or more $T_i$'s in the set are selectively replaced with the $P_i$'s and tested for conflicts. This selective replacement and testing process is a combinatorial problem, and for n trajectory modification requests there are 2n options. Even with a very modest queue size of five flights, there are thirty-two possibilities, which cannot be readily evaluated manually by the ATCo.

In view of the above, the objective is to employ an approach to dynamically handle multiple trajectory modification requests, so that the queue is periodically processed in an optimal manner under operational restrictions, with each periodic process performing a conflict assessment on the queued trajectory modification requests to determine which if any of the requests still pose conflicts with the 4D trajectories of other aircraft within the airspace. During such periodic processing, more recent requests can be given higher priority to maximize the total time that aircrafts fly according to their preferences. With these capabilities, the preferences management module represented in FIGS. 1 through 3 would be more readily capable of accommodating user preferences through trajectory modification requests via en-route negotiations.

From the foregoing, it should be appreciated the queue process module (FIG. 4) of the preferences management module must be configured to accept trajectory modification requests that cannot be immediately cleared by the ATC system due to situational conflicts, and capable of efficiently processing the queued (pending) requests on a timely basis. As previously described in reference to FIG. 1, while agreed and synchronized trajectories of aircraft within an airspace are conflict-free for some time horizon, one or more of the aircraft may desire altitude, lateral, and/or velocity changes so that they can attain a more optimal flight profile, which may include passing maneuver preferences, as may be recommended by their on-board flight management system (FMS). In this case, the preferences, expressed as trajectory modification requests, are down-linked to the ATC system on the ground. The ATC system must then identify a combination of trajectory modification requests that will by conflict free. As evidenced from the following discussion, various algorithms for this purpose are possible, including heuristic algorithms, to efficiently process a set of queued requests, though it should be understood that other algorithms could be developed in the future.

A first heuristic solution views the above selective replacement and test process as a binary combinatorial assignment problem. The assignment $\{P_1, P_2, \ldots, P_n\}$ is first conflict-probed, and if the result is a conflict-free trajectory portfolio, then the entire portfolio is cleared via communications with the aircraft. However, if a conflict is detected, an n-bit truth table can be constructed to explore the options with n-k bits active, where k is an integer greater than or equal to 1 but less than n. As an example, each option in the truth table corresponds to a trajectory portfolio $\{P_1, P_2, \ldots T_m, \ldots P_n\}$, where trajectory modification requests ($P_n$) for all but one aircraft (request $T_m$ for aircraft $A_m$) are tentatively granted. Within the alternate trajectory portfolios, the trajectory modification request(s) that is/are not tentatively granted is/are different for each portfolio. Each of these alternate trajectory portfolios is conflict-probed, and those portfolios that result in a conflict are eliminated. If a single portfolio exists that is conflict-free, the trajectory modification requests associated with that portfolio are granted and cleared via communications with the aircraft that transmitted the granted requests. In the case where multiple portfolios are determined to be conflict-free, a cost computation can be performed that compares relative operational costs associated with granting each of the conflict-free portfolios, including the additional benefits associated with granting more recent requests, so that the portfolio with the lowest cost can be selected. The relative operational costs can take into account fuel-related and/or time-related costs. The trajectory modification requests associated with the selected portfolio are then granted and cleared via communications with the aircraft that transmitted the granted requests, and the granted modification requests can be purged from the queue. On the other hand, if no conflict-free trajectory portfolios are identified with n-1 preferences active, the process can be repeated with n-2 preferences active. This process can be repeated with n-3, n-4, and so on until all the possible trajectory portfolios have been explored. The worst-case situation is that all 2n trajectory portfolios result in a conflict. The worst-case computational complexity for this heuristic is also exponential.

Another heuristic solution is to consider alternate preferences for one or more of the aircraft according to some consideration sequence. When a flight's preference (trajectory modification requests, $P_i$) is considered, all other flight trajectories are held at their current or tentatively accepted state. A tentatively accepted state corresponds to a modified trajectory that has been temporarily cleared but which has not been communicated to the aircraft as a cleared modification. For each flight, its modification preference is considered, and it is checked if accepting that preference would ensure a conflict-free flight. If a conflict is detected, that preference is discarded from consideration, and the next flight's modification preference is considered and a similar conflict probe is performed. This process can be continued until the modification preference of each flight in the portfolio has been considered in trial planning. Next, each flight whose modification preference was discarded earlier is considered in sequence until no further conflict-free acceptances are possible. This iterative process can be repeated until no further modification preferences can be accepted. At this point, a final conflict probe is performed and the set of tentative modifications are granted and cleared via communications with the aircraft. In the situation that a given aircraft can provide more than one modification request, and its first preferred modification request results in a conflict, its other preferences may be considered in sequence.

Yet another combinatorial approach to queue processing uses the node packing problem over a conflict graph, what will be defined herein as an optimal guided combinatorial search. Formally, a conflict graph is a graph G=(V,E) such that an edge exists between any two nodes that form a conflict (i.e., two events that cannot occur together). Let T denote some time window that is decided upon by the ATCo. A conflict graph is formed as follows. Let A denote all aircraft that appear in the given airspace within T. Also let $A' \subset A$ denote the aircraft that have a previously denied request in the queue. Let $V=V^1 \cup V^2$ partition all nodes as follows. Every aircraft $a \in A$ will have a node in $V^1$ that represents the original trajectory. Every aircraft $a' \in A'$ will have a node in $V^2$ that represents the requested trajectory for that aircraft. All nodes in $V^1$ alone are conflict-free as they represent the original trajectories. Therefore, all flights represented in $V^2$ must be conflict probed with both (a) all nodes in $V^1$ and (b) all other nodes in $V^2$. For every conflict that exists between $v' \in V^2$ and $v'' \in V^1 \cup V^2$, draw an edge between v' and v''. The result is a conflict graph. As an edge represent a conflict within T, then no more than one node can be "chosen" for every edge. This is precisely the set of constraints that define the node packing problem.

The graph will consist of two sets of nodes: aircraft corresponding with original trajectories and aircraft corresponding with requested trajectories. Let k' denote the node in the graph that represents the trajectory request for aircraft $k \in \{1, 2, \ldots, 5\}$. Edges are constructed between every pairwise conflict. For a given weight vector w the maximum-weight node packing problem would be solved.

Two algorithms have been implemented for solving the max-weight node packing problem. One can define which algorithm to use when calling the queue processing algorithm. One of the algorithms is LP-Heuristic: the MWNPP is solved, let $\bar{x}$ denote an optimal solution. Clearly if $\bar{x}$ is integral, then $\bar{x}$ is optimal for the original problem. Otherwise, a feasible solution is returned by rounding the fractional component with the highest weight up to 1, and its neighbors down to zero. This is done for all fractional components until the rounded vector is integral. The other algorithm is a "Greedy" approach: the weight vector is sorted in non-increasing order. The node with the highest weight is assigned value 1, and all of its neighbors are assigned to 0. Then the next highest-weight node is chosen that has not been assigned a value, and the process is repeated until every node has been assigned a value of 0 or 1.

From the above, it should be evident that the queuing process greatly facilitates the ability of the ATC system to accommodate trajectory modification requests from multiple aircraft in a given airspace. In so doing, utilization of the queuing process within the preference management method enables aircraft to achieve preferred cruise altitudes and/or trajectories during flight so that business costs associated with the aircraft can be reduced and possibly minimized while ensuring safe separation between all flights in the airspace.

Figure 5:
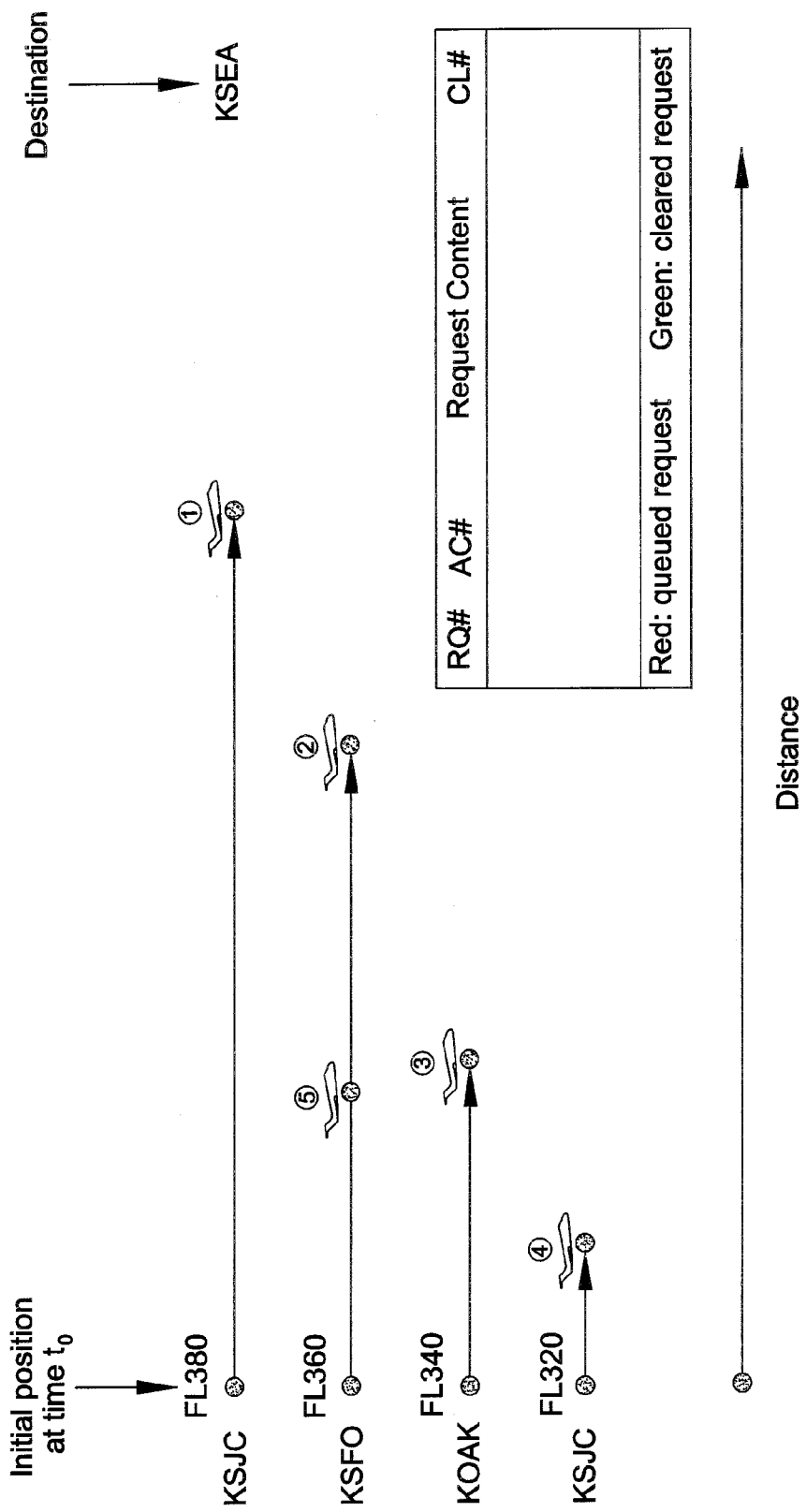
FIGS. 5 through 10 illustrate an example of implementing the preference management method and system of FIG. 1.

FIGS. 5 through 10 help to illustrate the implementation of the preference management method of this invention. FIG. 5 represents a set of five aircraft, designated as 1, 2, 3, 4 and 5, identified as departing from airports designated as KSJC, KOAK or KSFO, and all destined for an airport designated as KSEA. In this baseline scenario, all flights follow their flight plan cruise altitudes, designated as FL320, FL340, FL360 and FL380. All flights are altitude-separated except for the two KSFO flights (2 and 5), which are time separated at the same altitude (FL360). For visual representation simplicity, all flights are assumed to be flying at the same true airspeed in this scenario.

Figure 6:
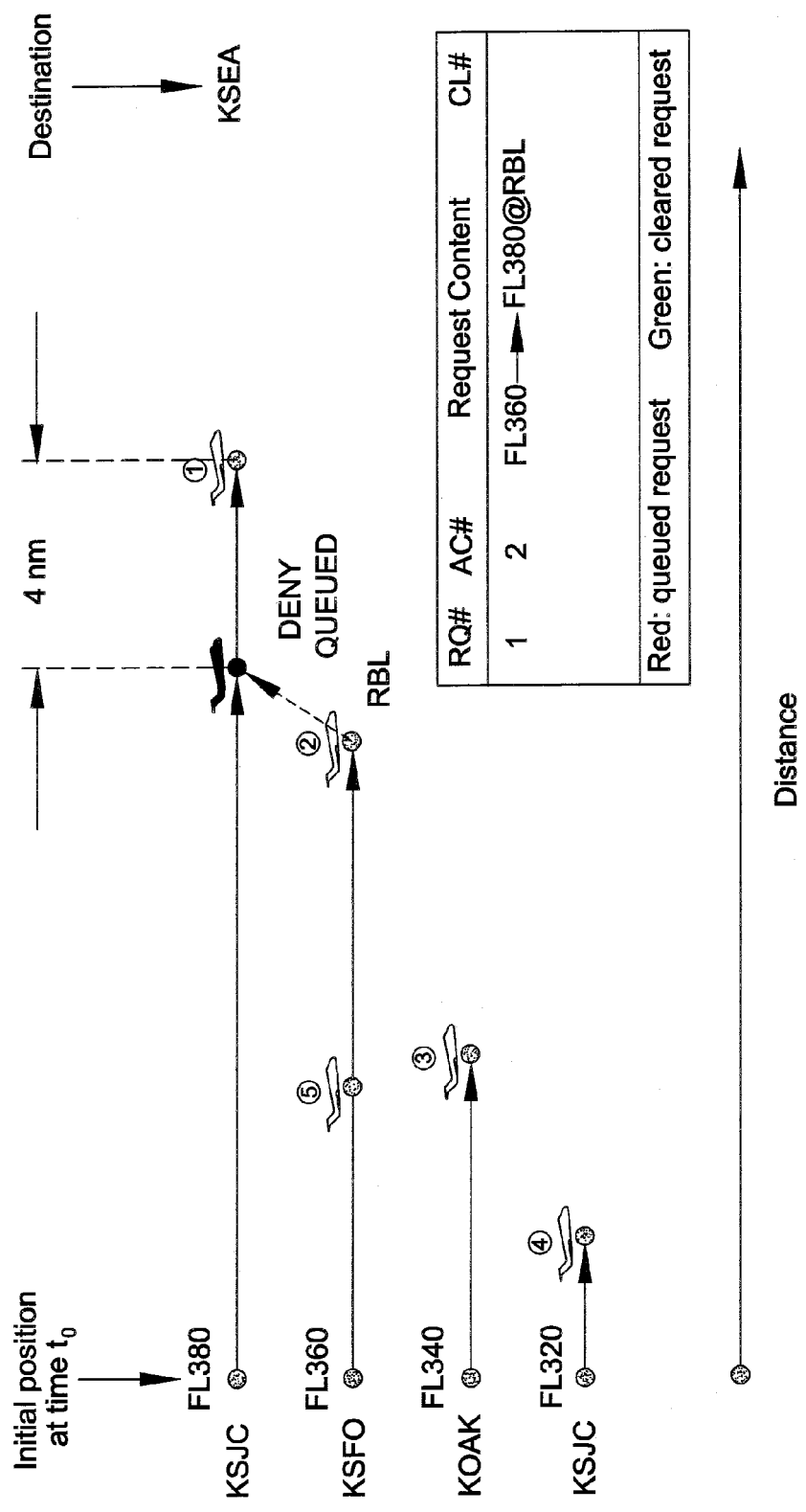

In FIG. 6, Flight 2 from KSFO makes a request to climb from altitude FL360 to FL380, but that request is denied because granting the request would result in a separation conflict with Flight 1 from KSJC cruising at FL380. This request is queued, as represented by its request being entered in a queue box in FIG. 6.

Figure 7:
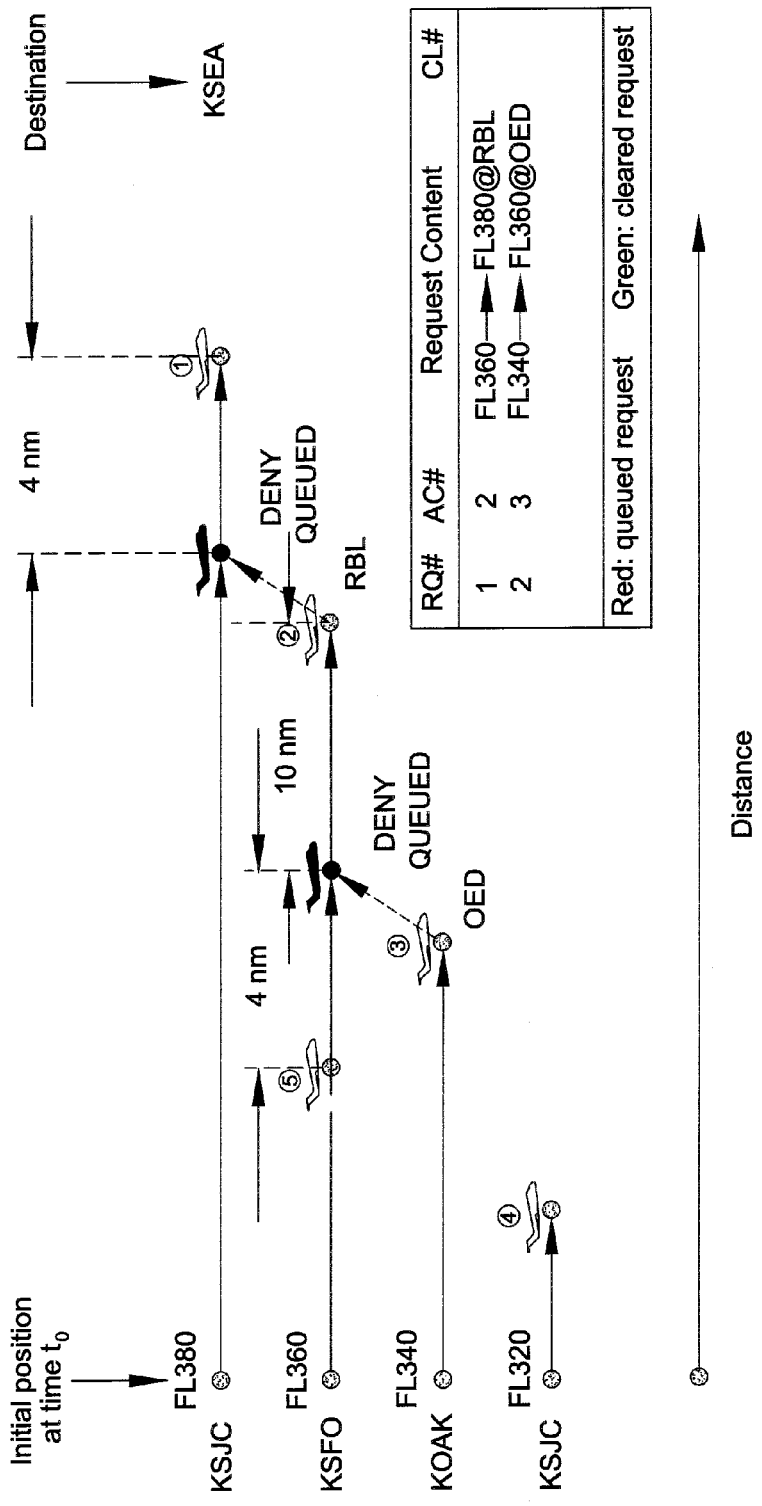

In FIG. 7, Flight 3 from KOAK makes a request to climb from FL340 to FL360, but that request is also denied because granting the request would result in a separation conflict with Flight 2 from KSFO cruising at FL360. As such, this second request is also queued, and shown in the queue box in FIG. 7.

Figure 8:
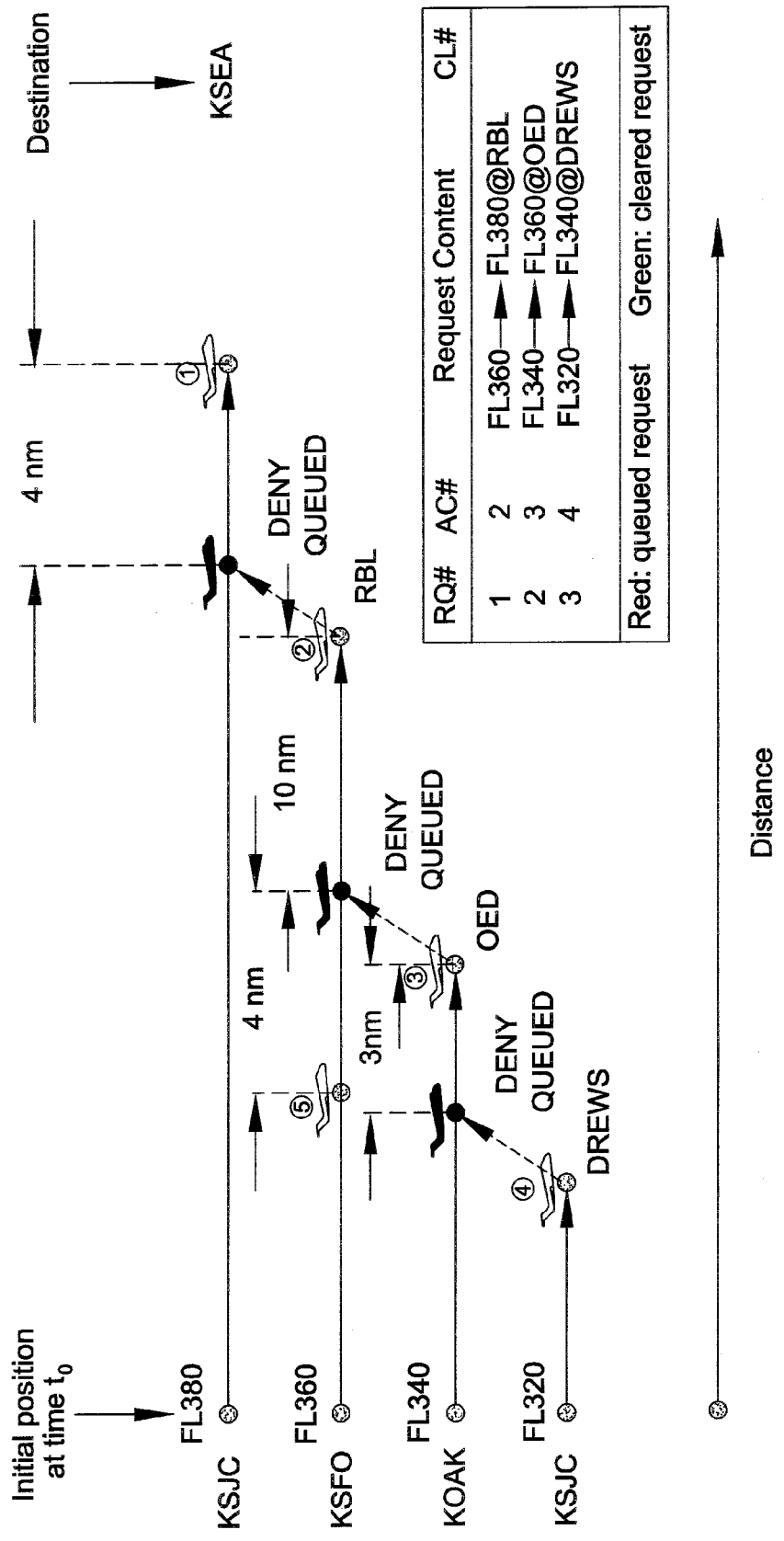

In FIG. 8, Flight 4 from KSJC makes a request to climb from FL320 to FL340, but that request is denied because granting the request would result in a separation conflict with Flight 3 from KOAK cruising at FL340. This third request is then queued, and shown in the queue box in FIG. 8.

Figure 9:
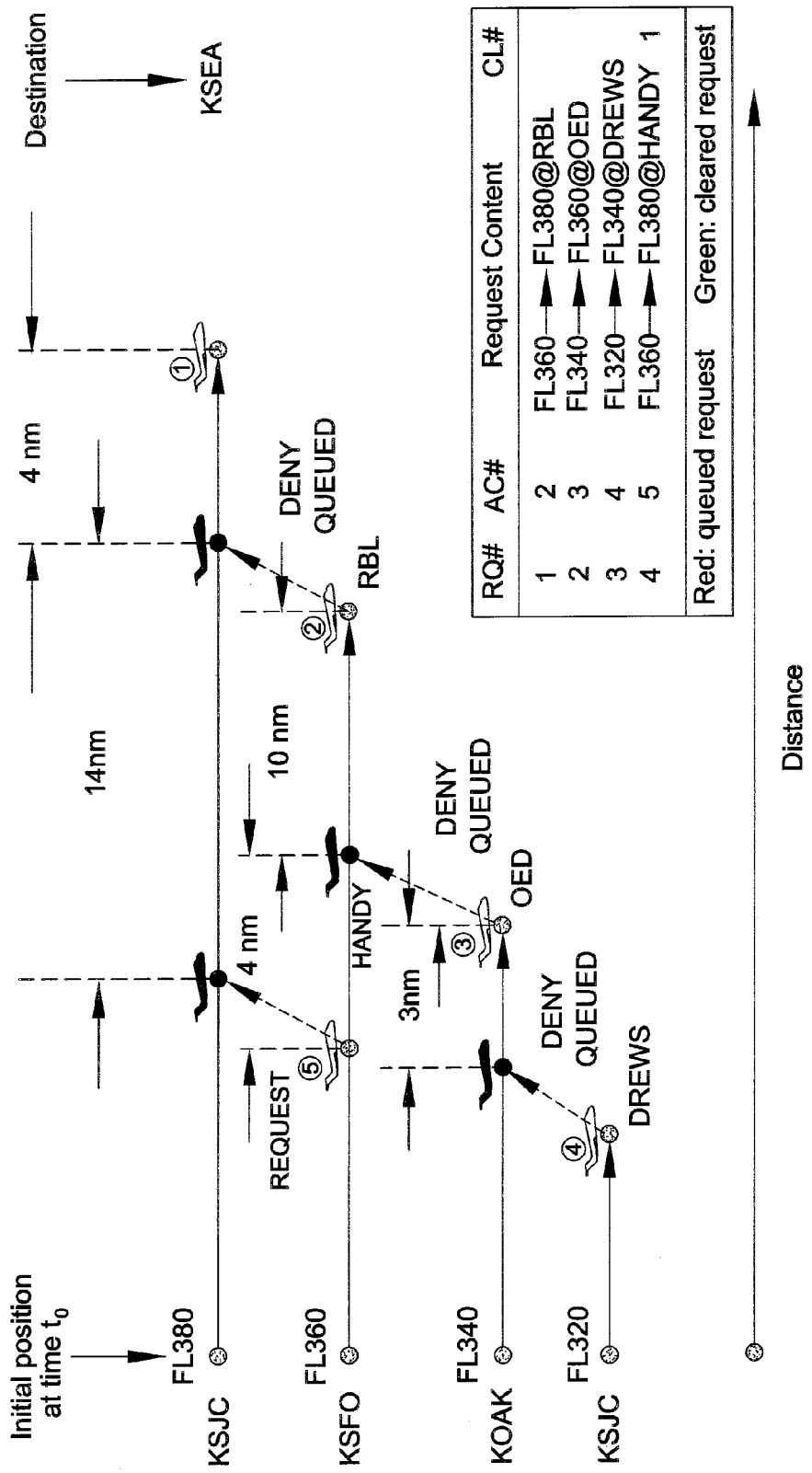
Figure 10:
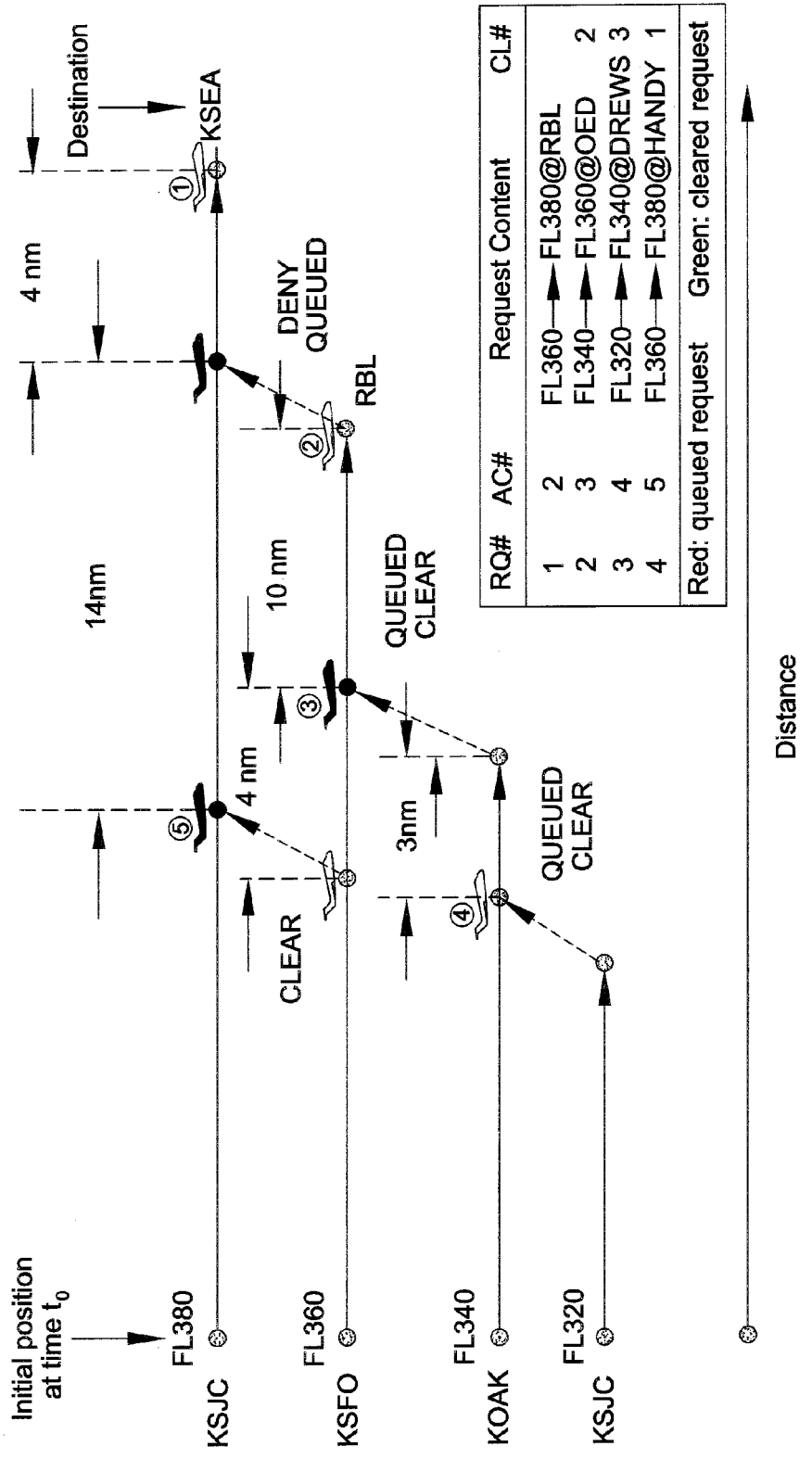

In FIG. 9, Flight 5 from KSFO has made a request to climb from FL360 to FL380, and that request is immediately granted as it is conflict free. As a result of the granted request in FIG. 9, FIG. 10 represents the result of queue processing performed on the queue, in which three of the pending requests are cleared for cruise climb because the altitude change granted for Flight 5 has facilitated a conflict constraints resolution. Even so, the request from Flight 2 remains pending in the queue and cannot be granted unless further changes in circumstances occur.

From the above, it should be evident that preference management can be employed to enable an ATC system to facilitate one or more aircraft flying in a given airspace to achieve user-preferred 4D (altitude, latitude, longitude and time) trajectories (4DTs) during flight, so that operational costs associated with the aircraft (for example, fuel burn, flight time, missed passenger connections, etc.) may be reduced or minimized while ensuring safe separation between all flights in the airspace. Preference management further allows ATC systems to support national airspace-wide fuel savings and reduce delays.

In addition to trajectory modification requests from aircraft, trajectory negotiations can also be initiated as a result of observations on the ground that the paths and/or speeds of one or more aircraft must be modified so that they may meet their scheduled times-of-arrival (STAs). The negotiation framework to address this event type is the aforementioned schedule management method of this invention, which can be implemented as a module used in combination with the preference management module described above. In any event, the schedule management framework provides a method and system by which one or more aircraft flying in a given airspace can more readily achieve system preferred time targets such that business costs relevant to the aircraft operator are minimized and system delay costs are minimized without violating flight safety restrictions. As with the preference management method and system discussed in reference to FIGS. 1 through 10, trajectory negotiations occur between aircraft and an ATC system (as these terms were previously defined under the discussion of the preference management method and system).

Figure 11:
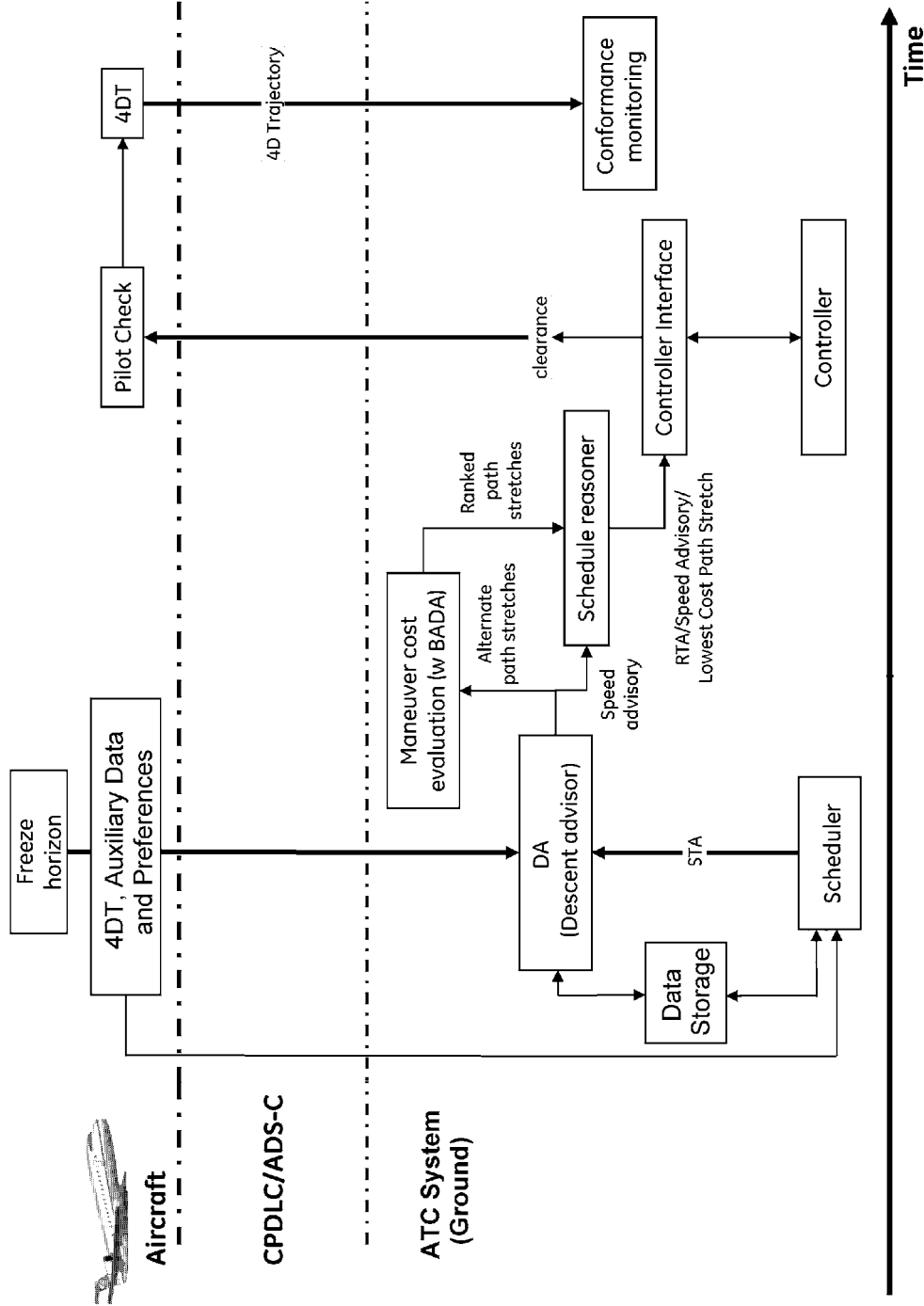
FIG. 11 is a block diagram of a schedule management method and system for modifying the paths and/or speeds of aircraft so that they may meet scheduled times-of-arrival (STAs) at an airport in accordance with another aspect of this invention.

As represented in FIG. 11 the schedule management module comprises sub-modules, two of which are identified as a "Scheduler" and "DA" (descent advisor). An Arrival Manager (AMAN) is commonly used in congested airspace to compute an arrival schedule for aircraft at a particular airport. The DA function is related in principle to NASA's En Route Descent Advisor (EDA), although there are key additions to this functionality. The schedule management module uses aircraft surveillance data and/or a predicted trajectory from the aircraft to construct a schedule for aircraft arriving at a point, typically a metering fix located at the terminal airspace boundary. Today, this function is performed by the FAA's Traffic Management Advisor (TMA) in the USA, while other AMANs are used internationally. In general, this invention makes use of an arrival scheduler tool that monitors the aircraft based on aircraft data and continually computes the sequences and STAs to the metering fix. Although most current schedulers compute STAs using a first-come first-served algorithm, there are many different alternative schedule means, including a best-equipped best-served type of schedule. DA, on the other hand, is an advisory tool used to generate maneuver advisories to aircraft that will enable the aircraft to accurately perform maneuvers (speed changes and/or path stretches) that will deliver the aircraft to the metering fix according to the STA computed by the Scheduler.

With further reference to FIG. 11, one or more aircraft within an airspace of interest are monitored by an ATC system. For example, the ATC system monitors the 4D (altitude, lateral route, and time) trajectory (4DT) of each aircraft as it enters the airspace being monitored by the ATC system. For each aircraft of interest, the Scheduler generates an STA at one or more metering fix points, which may be associated with the aircraft's destination airport. STA's for multiple aircraft are stored in a queue that is part of a computer-based data storage that can be accessed by the Scheduler and DA. The DA then performs a computation to determine if, based on information inferred or downlinked from the aircraft, the aircraft will be able to meet its STA. If necessary and possible, the ATC system transmits instructions to the aircraft to ensure that the aircraft will arrive at the metering fix point at the STA and, as may be necessary, will update the STA for each aircraft stored in the queue. As represented in FIG. 11, the computations of the DA delivered to a Schedule Reasoner (discussed below in reference to FIG. 13) prior to being passed on to an ATCo interface (such as a graphic/user interface), which performs the task of transmitting the instructions to the aircraft.

To generate maneuver advisories capable of accurately delivering the aircraft to the metering fix according to the STA, the DA requires current predicted four-dimensional trajectory (4DT) as well as auxiliary data relating to the operation and state of the aircraft. Such auxiliary data may include one or more of the following: preferred time-of-arrival (TOA), earliest estimated time-of-arrival ($ETA_{Min}$), latest estimated time-of-arrival ($ETA_{Max}$), current planned speeds (where speeds could be a calibrated airspeed (CAS) and/or Mach number for one or more flight phases (climb, cruise, or descent)), preferred speeds (which may be minimum fuel-cost speeds), minimum and maximum possible speeds, and alternate proposed 4DTs for minimum fuel speeds along the current lateral route and current cruise altitude. Aircraft with appropriate equipment (such as FMS and Data Communication (DataComm)) are capable of providing this auxiliary data directly to the ATC system. In particular, many advanced FMS are able to accurately compute this data, which can be exchanged with the ATC system using CPDLC, ADS-C, or another data communications mechanism between the aircraft and ATC system, or another digital exchange from the flight dispatcher.

In practice, it is likely that many aircraft will be unable to provide some or all of this auxiliary data because the aircraft are not properly equipped or, for business-related reasons, flight operators have imposed restraints as to what information can be shared by the aircraft. Under such circumstances, some or all of this information will need to be computed or inferred by the ATC system. Because fuel-optimal speeds and in particular the predicted 4DT are dependent on aircraft performance characteristics to which the ATC system does not have access (such as aircraft mass, engine rating, and engine life), auxiliary data provided by appropriately equipped aircraft are expected to be more accurate than auxiliary data generated by the ATC system. Therefore, certain steps need to be taken to enable the ATC system to more accurately infer data relating to aircraft performance characteristics that will assist the ATC system in predicting certain auxiliary data, including fuel-optimal speeds, predicted 4DT, and factors that influence them when this data is not provided from the aircraft itself. As explained below, the aircraft performance parameters of interest will be derived in part from aircraft state data and trajectory intent information typically included with the auxiliary data provided by the aircraft via a communication datalink. Optionally or in addition, surveillance information can also be used to improve the inference process. The inferred parameters are then used to model the behavior of the aircraft by the ATC system, specifically for trajectory prediction purposes, trial planning, and estimating operational costs associated with different trial plans or trajectory maneuvers.

In order to predict the trajectory of an aircraft, the ATC system must rely on a performance model of the aircraft that can be used to generate the current planned 4DT of the aircraft and/or various "what if" 4DTs representing unintentional changes in the flight plan for the aircraft. Such ground-based trajectory predictions are largely physics-based and utilize a model of the aircraft's performance, which includes various parameters and possibly associated uncertainties. Some parameters that are considered to be general to the type of aircraft under consideration may be obtained from manufacturers' specifications or from commercially available performance data. Other specific parameters that tend to be more variable may also be known, for example, they may be included in the filed flight plan or provided directly by the aircraft operator. However, other parameters are not provided directly and must be inferred by the ATC system from information obtained from the aircraft, and optionally, from surveillance information. The manner in which these parameters can be inferred is discussed below.

Aircraft performance parameters such as engine thrust, aerodynamic drag, fuel flow, etc., are commonly used for trajectory prediction. Furthermore, these parameters are the primary influences on the vertical (altitude) profile and speed of an aircraft. Thus, performance parameter inference has the greatest relevance to the vertical portion of the 4DT of an aircraft. However, the aircraft thrust, drag, and fuel flow characteristics can vary significantly based on the age of the aircraft and time since maintenance, which the ATC system will not likely know. In some cases, airline performance information such as gross weight and cost index cannot be shared directly with ground automation because of concerns related to information that is considered strategic and proprietary to the operator.

However, it has been determined that thrust during the climb phase of an aircraft is considered to be known with a high level of certainty, with variations subject only to derated power settings. In fact, the along-route distance corresponding to the top of climb point can be expressed as a function of takeoff weight (TWO). As such, there is a direct dependency between the distance to top of climb and TOW up to a certain value of TOW. A weight range is also known from the aircraft manufacturer specifications, which may be further enhanced with knowledge originating from the filed flight plan and from applicable regulations (distance between airports, distance to alternate airport, minimum reserves, etc.). Additional inputs to the prediction model, including aircraft speeds, assumed wind speeds, and roll angles can be derived from lateral profile information and used to predict a vertical profile for the aircraft.

In view of the above, knowledge of an aircraft's predicted trajectory during takeoff and climb can be used to infer the takeoff weight (mass) of the aircraft. If an estimate of the aircraft's fuel flow is available, this can be used to predict the weight of the aircraft during its subsequent operation, including its approach to a metering fix. Subsequent measurements of the aircraft state (such as speeds and rate of climb or descent) relative to the predicted trajectory can be used to refine the estimate of the fuel flow and predicted weight. The weight of the aircraft can then be used to infer auxiliary data, such as the minimum fuel-cost speed and predicted trajectory parameters of the aircraft, since they are known to depend on the mass of the aircraft. As an example, the weight of the aircraft is inferred by correlating the takeoff weight of the aircraft to the distance to the top of climb that occurred during takeoff. A plurality of generation steps can then be used to predict a vertical profile of the aircraft during and following takeoff. Each generation step comprises comparing the predicted altitude of the aircraft obtained from one of the generation steps with a current altitude of the aircraft reported by the aircraft. The difference between the current and predicted altitudes is then used to generate a subsequent predicted altitude of the first aircraft.

Figure 12:
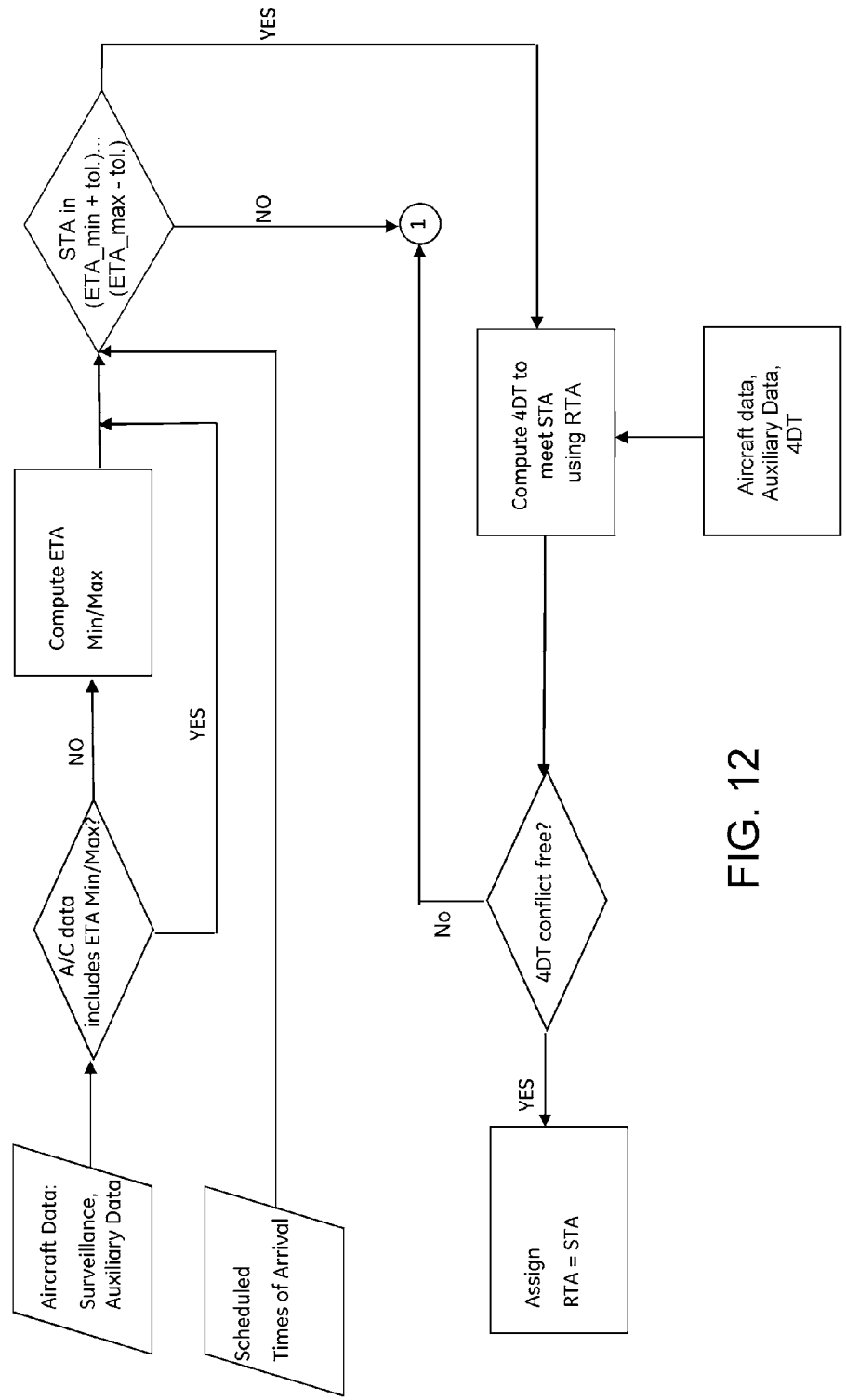
FIGS. 12 and 13 are block diagrams indicating processes performed by an advisory tool of the schedule management method and system of FIG. 11.

As depicted by the block diagram of FIG. 12, the STA and aircraft data (including surveillance and auxiliary data) are inputs to the DA automation, which is responsible for generating the maneuver advisories for the aircraft, if necessary, to meet the STA. The DA uses predicted earliest and latest time of arrival values ($ETA_{Min}$ and $ETA_{Max}$) to determine the type of maneuver required to meet the STA. These time bounds may be further padded to account for potential uncertainty in the $ETA_{Min}$ and $ETA_{Max}$ computation, or uncertainty in the winds that will be encountered while flying to the metering fix which could cause the true time of arrival to fall outside of the predicted time bounds. If the STA is between the (potentially padded) $ETA_{Min}$ and $ETA_{Max}$ bounds of the aircraft, this can be achieved by simply assigning the STA to the aircraft as a time constraint and allowing the aircraft's TOA control (TOAC) function (often referred to as a required time-of-arrival (RTA)) to guide and deliver the aircraft to the metering fix at its STA. The 4DT associated with assigning the STA as an RTA is either provided from the aircraft (for example, via data link) or computed by the ATC automation using the inferred aircraft parameters described previously. However, if the STA is outside of the ETA bounds or the 4DT associated with the RTA is not acceptable (for example, if it will result in a conflict with the 4DT of another aircraft), a speed advisory (with potentially different speeds for each phase of flight) or RTA assignment, possibly combined with an alternative lateral route (specified by lateral fixes or procedures (path stretches)) and possibly vertical constraints (such as cruise altitude or waypoint altitude restrictions) can be computed by the DA that will result in the aircraft meeting the system desired STA while honoring all relevant ATC constraints (such as staying within the necessary arrival corridor, or passing over a set of fixes). For example, if the computation indicates that the STA of the aircraft is later than its $ETA_{max}$, the DA can generate a path stretch maneuver that involves a modified lateral route that sufficiently extends the $ETA_{max}$ so that the aircraft will achieve its STA at the metering fix point. Alternatively, a vertical maneuver that requires the aircraft to descend to a lower intermediate altitude where it is able to fly at lower speeds (due to a higher air density) may be used, potentially in combination with a lateral path stretch. However, if the computation indicates that the STA of the aircraft is prior to its $ETA_{min}$, the most accessible solution will typically involve assigning the $ETA_{min}$ as the RTA for the aircraft at the metering fix point, and then allowing the FMS of the aircraft to modify its speed to achieve the RTA at the metering fix point. The DA forwards the results of its computations to the Schedule Reasoner which then, depending which of the above scenarios exists, issues the appropriate information to the ATCo interface. The interface may initiate an automatic uplink of the clearance to the aircraft or provide the clearance information to the ATCo for further action.

Figure 13:
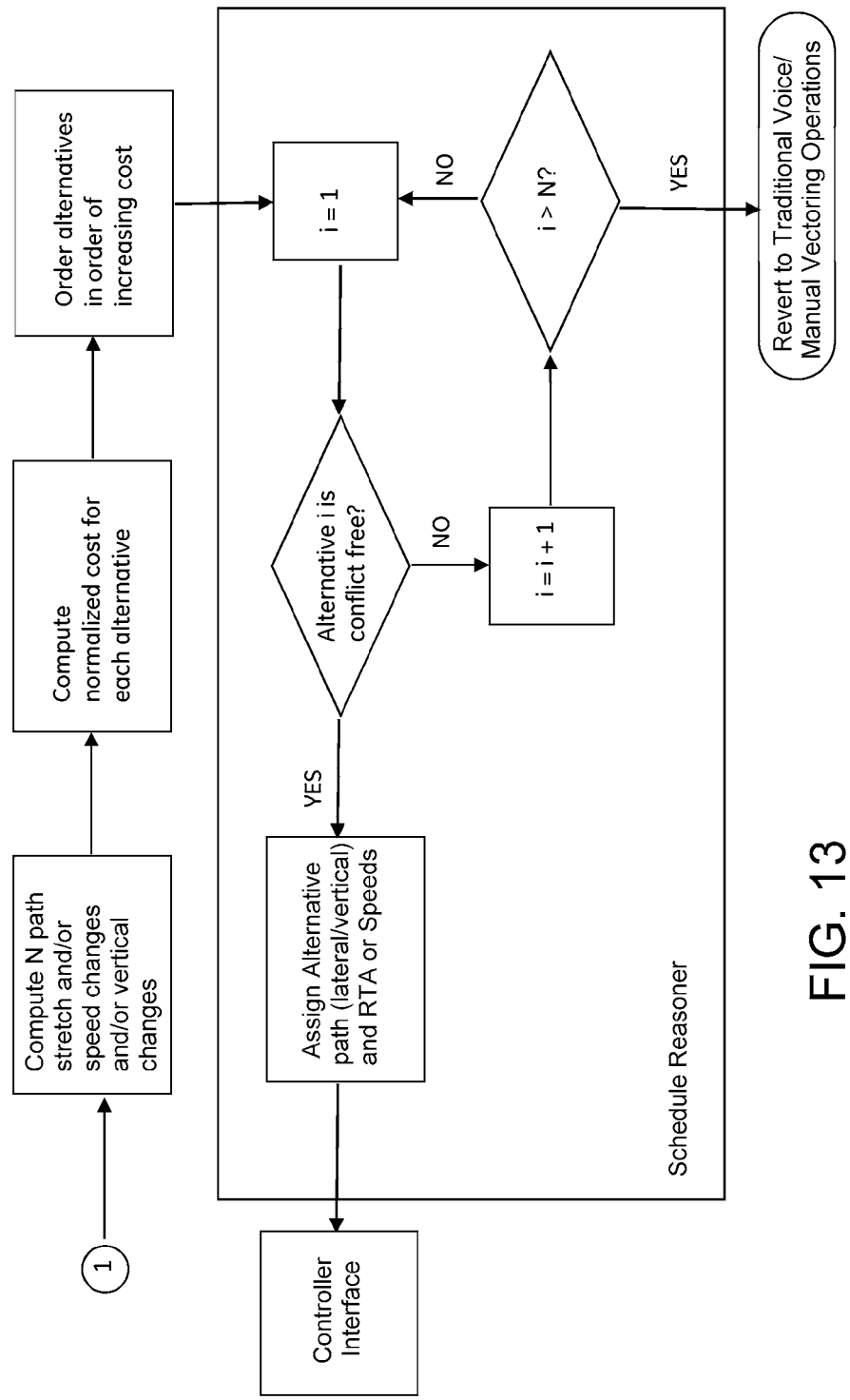

FIG. 13 is a block diagram representing scenarios in which modifications to the lateral route or vertical path are necessary, as represented by the node 1 in FIG. 12 and carried over as the input in FIG. 13. The DA can generate one or more alternative 4DTs characterized by different changes to altitude, speed and/or lateral route, for example, alternative path-stretch trajectories or a descent to a lower altitude with alternative speeds to delay the arrival of the aircraft at its metering fix. The process of generating alternative trajectories may be guided by user preferences, as described above for the preference management method and system of this invention. If multiple alternate 4DTs are proposed, the DA compares each alternate 4DT to an aggregate of other trajectories for a subset or entirety of all known traffic in the given airspace. The comparison identifies any conflicts (a violation of minimum separation between predicted aircraft states correlating to the trajectories) between each potential 4DT from the initial set and all relevant background traffic. The 4DTs of the background traffic are maintained in the data storage of the ATC system. If no conflict is identified, or if the probability of the potential conflict is below a certain threshold, for two or more 4DTs in the initial set, the alternative 4DTs can be forwarded to a module that performs a maneuver cost evaluation, by which the normalized cost of the speed and/or trajectory modification maneuver is computed for each alternate 4DT. This cost computation may further utilize aircraft performance models and/or cost information provided directly from the aircraft or inferred from auxiliary data to compute fuel usage profiles. The ATC system preferably ranks the alternative 4DTs according to their normalized cost, and the ranked list is input to the Schedule Reasoner, which selects the lowest cost (highest ranked) trajectory modification that does not pose a conflict with 4DTs of other aircraft or violate any airspace constraints. These trajectory modifications may include lateral path changes, altitude changes, and either speed assignments or an RTA time constraint. This information is then input to the ATCo interface, which initiates an automatic uplink of the clearance to the aircraft or provides the clearance information to the ATCo for further action.

The schedule management module has an initial and final scheduling horizon. The initial scheduling horizon is a spatial horizon, which is the position at which each aircraft enters the given airspace, for example, the airspace within about 200 nautical miles (370.4 km) of the arrival airport. The ATM manager monitors the positions of aircraft, and is triggered once an aircraft enters the initial scheduling horizon. The final scheduling horizon, referred to as the STA freeze horizon, is defined by a specific time-to-arriving metering fix. The STA freeze horizon may be defined as an aircraft's metering fix ETA of less than or equal to twenty minutes in the future. Once an aircraft has penetrated the STA freeze horizon, its STA remains unchanged, the DA is triggered, and any meet-time maneuver is uplinked to the aircraft to carry out the plan devised by the schedule manager.

Figure 14:
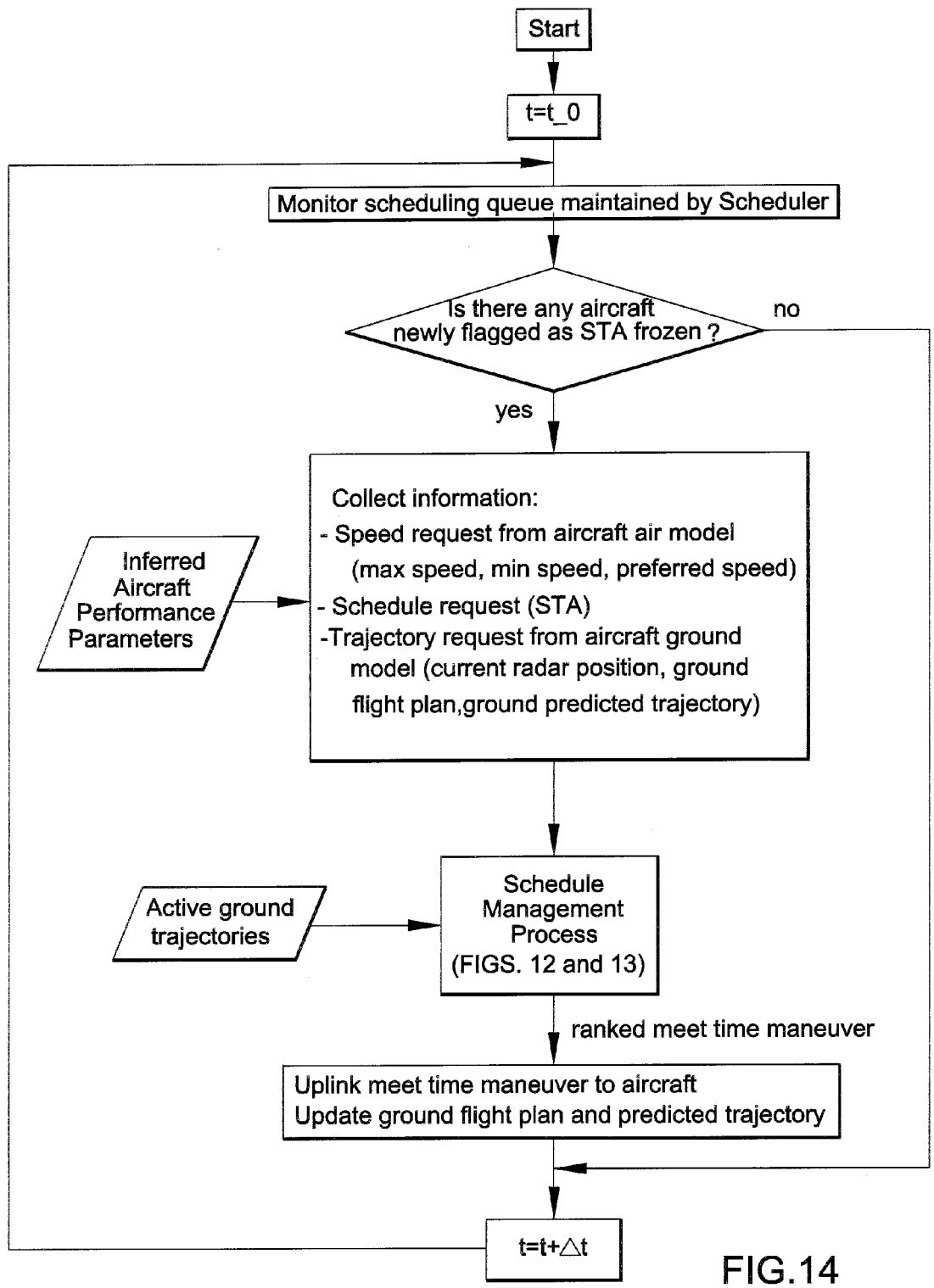
FIG. 14 is a flow chart representing operations performed by the advisory tool of the schedule management method and system of FIG. 11.

FIG. 14 is a flow chart representing operations performed by the DA module. As indicated in FIG. 14, the DA module monitors the scheduling queue maintained by the Scheduler in the data storage of the ATC system. Alternatively, the DA module could be event driven and invoked by the Scheduler as needed, for example, when an aircraft penetrates the final scheduling horizon. The DA then collects speed information from the aircraft, the predicted trajectory of the aircraft (either provided directly from the aircraft or predicted on the ground), and the schedule plan from the Scheduler. The DA then generates one or more meet-time maneuvers (speed adjustment or time constraint, altitude adjustment, and/or path stretches) for the aircraft, performs a conflict probe of each generated meet-time maneuver with existing active predicted trajectories, and eliminates any meet-time maneuvers with conflicts. Within the conflict-free meet-time maneuver pool, a cost evaluation process is performed (for example, by the maneuver cost evaluation module) from which the DA selects a preferred meet-time maneuver. The selected maneuver is then output to an interface, where it may be uplinked to the aircraft or provided to another user for further processing. In the event that none of the meet-time maneuvers is conflict free, the schedule management module may utilize a traditional voice/manual operation (FIG. 13).

The Scheduler obtains information from the ground and potentially equipped aircraft which are capable of providing trajectory information. This creates a predicted aircraft trajectory and contains dynamically evolving aircraft state information (for example, 4D position, ground speed, course, and altitude rate). The Scheduler generates a schedule plan for the DA, which collects information from both air (aircraft) and ground, and provides information to both the air and ground. This process may also use the inferred data described previously if data cannot be provided directly from the aircraft itself.

As previously noted, the schedule algorithm implemented in the Scheduler may be, for example, a dynamic first-come first-served algorithm based on the order of estimated times of arrival at the scheduled metering fix or it could give preference to better equipped aircraft which can provide more accurate trajectory information and meet the STA using airborne TOAC algorithms. When the Scheduler is initialized, the algorithm constructs an empty queue for each managed metering fix. When an aircraft enters the initial scheduling horizon, this aircraft is pushed into the corresponding scheduling queue and the algorithm updates the STA for each aircraft in the queue if needed. When an aircraft is in the scheduling queue and its ETA is changed, the same process will be performed to the whole scheduling queue. When an aircraft is in the scheduling queue and it penetrates the freeze horizon, its STA will remain unchanged in the queue until it leaves the queue.

The scheduling algorithm receives data for each aircraft in the scheduling queue, for example, ETA (minimum and maximum), aircraft weight class, aircraft identification, etc. For each scheduling queue, the STA update process can be described as follows. If there are no aircraft with their STA frozen, the aircraft is processed based on the order of its ETA at metering fix. The processed aircraft is assigned a time equal to its ETA or the earliest time that ensures the minimum time-separation required for the types of aircraft that are scheduled earlier in the queue, whichever is larger. If there are some aircraft with frozen STAs, the aircraft are sorted with frozen STAs based on their STAs, and these aircraft are treated as pre-scheduled aircraft. The aircraft with unfrozen STAs are then processed based on the order of their ETAs at metering fix. The Scheduler algorithm checks the status of each scheduling queue every loop cycle, keeping the STAs constantly updated until they are frozen.

Figure 15:
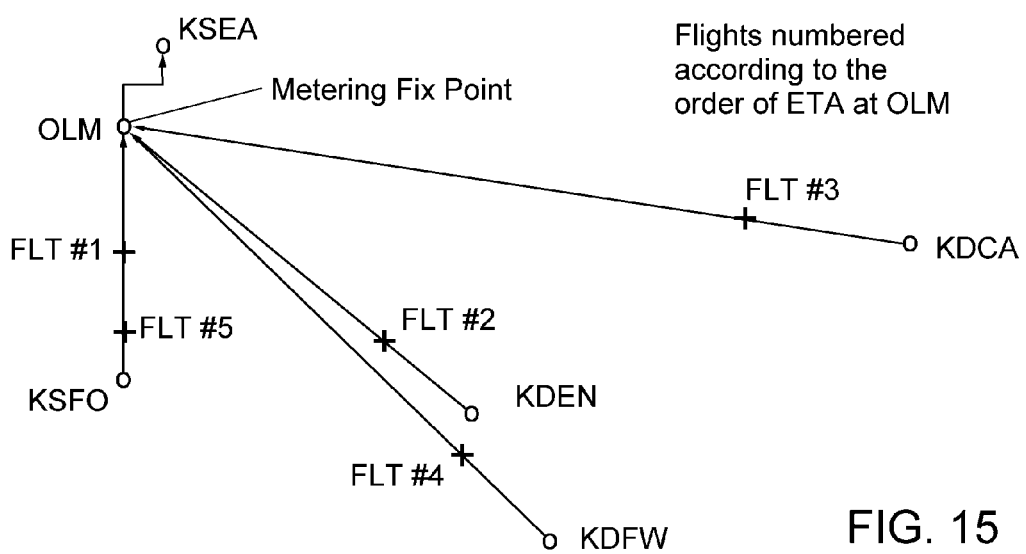
FIG. 15 illustrates an example of a scenario for implementing the schedule management method of this invention.

FIG. 15 helps to illustrate a scenario in which the schedule management method of this invention can be implemented. FIG. 15 represents a set of five aircraft, designated as FLT #1 through #5, identified as departing from airports designated as KSFO, KDEN, KDFW, and KDCA, and all destined for an airport designated as KSEA. In this baseline scenario, all five arrival flights will conflict when they merge at their metering fix point, designated as OLM. The Scheduler generates STAs at the metering fix for all five flights, the DA associated with the metering fix generates speed changes or meet-time advisories from the freeze horizon (twenty flying minutes prior to metering fix) to the metering fix. All five flights are scheduled by this process to arrive at OLM within a two-minute relative time window in the order indicated by the flight number, FLT #1 through #5.

From the above, it should be evident that the schedule management method and system can be employed to enable an ATC system to facilitate one or more aircraft flying in a given airspace to achieve system-preferred time targets and schedules which significantly reduce operating costs such as fuel burn, flight time, missed passenger connections, etc. As such, the schedule management method and system can facilitate an improvement in ATC operations in an environment with different types of aircraft performance capabilities (Mixed Equipage). By providing more optimum solutions to aircraft with better capabilities, this schedule management method and system encourages aircraft operators to consider the installation of advanced flight management systems (AFMS) that support air-ground negotiations.

While the invention has been described in terms of specific embodiments, it is apparent that other forms could be adopted by one skilled in the art. For example, the functions of components of the performance and schedule systems could be performed by different components capable of a similar (though not necessarily equivalent) function. Therefore, the scope of the invention is to be limited only by the following claims.

The invention claimed is:

1. A method of negotiating air traffic trajectory modification requests received from multiple aircraft that each has trajectory parameters comprising altitude, speed and lateral route thereof, the method comprising:
   transmitting from at least a first aircraft of the multiple aircraft at least a first trajectory modification request to alter the altitude, speed and/or lateral route of the first aircraft;
   performing, with a computer processing apparatus, a first conflict assessment to determine if the first trajectory modification request of the first aircraft poses a conflict with the altitudes, speeds and lateral routes of any other of the multiple aircraft;
   granting the first trajectory modification request and notifying the first aircraft of the first trajectory modification request being granted if a conflict is not identified by the first conflict assessment step, or not granting the first trajectory modification request and notifying the first aircraft of the first trajectory modification request not being granted if a conflict is identified by the first conflict assessment step; and then
   if the first trajectory modification request was granted, monitoring the altitude, speed and lateral route of the first aircraft to assess whether the altitude, speed and lateral route of the first aircraft complies with the first trajectory modification request; or
   if the first trajectory modification request was not granted, placing the first trajectory modification request in a queue, periodically processing the queue to perform, with a computer processing apparatus, at least one subsequent conflict assessment to determine if the first trajectory modification request of the first aircraft still poses a conflict with the altitudes, speeds and lateral routes of any other of the multiple aircraft, and then granting the first trajectory modification request and notifying the first aircraft of the first trajectory modification request being granted if a conflict is not identified by the subsequent conflict assessment step.

2. The method according to claim 1, wherein the altitude, speed and/or lateral route of the first trajectory modification request reduces operational costs of the first aircraft.

3. The method according to claim 1, wherein the altitude, speed and/or lateral route of the first trajectory modification request alters an estimated time at which the first aircraft will arrive at an airport.

4. The method according to claim 1, wherein the first trajectory modification request is transmitted from the first aircraft as a voice or datalink transmission from the first aircraft.

5. The method according to claim 1, wherein the first trajectory modification request is generated by an on-board flight management system of the first aircraft.

6. The method according to claim 1, wherein the transmitting and notifying steps are performed with a communications system chosen from the group consisting of controller-pilot data link communications systems and automatic dependent surveillance communications systems.

7. The method according to claim 1, wherein the conflicts comprise congestion in airspace surrounding a location and violations of minimum separation between the first aircraft and the other of the multiple aircraft.

8. The method according to claim 1, further comprising storing and updating the trajectory parameters of the multiple aircraft in a nontransitory data storage media.

9. The method according to claim 1, wherein the step of notifying the first aircraft of the first trajectory modification request being granted is automatically performed by a computer processing apparatus if a conflict is not identified by the first conflict assessment step.

10. The method according to claim 1, wherein prior to the notifying step the method further comprises informing an air traffic controller that the first conflict assessment step did not identify a conflict, and the notifying step is performed by the air traffic controller.

11. The method according to claim 1 wherein, if the first trajectory modification request of the first aircraft was not granted, the method further comprises:
   determining, based on received or inferred information associated with the first aircraft, an alternative trajectory modification characterized by an altitude, speed and/or lateral route that differs from the altitude, speed and/or lateral route of the first trajectory modification request of the first aircraft;
   performing a second conflict assessment to determine if the alternative trajectory modification poses a conflict with the altitudes, speeds and lateral routes of any other of the multiple aircraft; and
   if a conflict is not identified by the second conflict assessment step, proposing the alternative trajectory modification to the first aircraft.

12. The method according to claim 11, wherein the alternative trajectory is chosen on the basis of having lower operational costs associated therewith relative to the first trajectory modification request, and the operational costs are fuel-related and/or time-related costs.

13. The method according to claim 11, wherein after the step of proposing the alternative trajectory modification to the first aircraft, the method further comprises a step of accepting or rejecting the alternative trajectory modification by the first aircraft, wherein if the alternative trajectory modification is rejected by the first aircraft the first trajectory modification request of the first aircraft is returned to the queue for further periodic processing, and wherein if the alternative trajectory modification is accepted by the first aircraft the first trajectory modification request of the first aircraft is purged from the queue.

14. The method according to claim 1, wherein the first trajectory modification request has a finite time duration within the queue, and the first trajectory modification request is purged from the queue after expiration of the finite time duration.

15. The method according to claim 11, wherein the first trajectory modification request is one of multiple trajectory modification requests transmitted by at least some of the multiple aircraft, the method further comprising:
sequentially performing conflict assessments on the multiple trajectory modification requests to determine if any of the multiple trajectory modification requests pose conflicts with the altitudes, speeds and lateral routes of any other of the multiple aircraft;
placing in the queue n trajectory modification requests of the multiple trajectory modification requests that are identified as posing conflicts (where n is an integer greater than 2);
performing the subsequent conflict assessment during the periodic processing of the queue, the subsequent conflict assessment comprising a plurality of tentative conflict assessment steps, each of the tentative conflict assessment steps comprising:
sorting the n trajectory modification requests into sets containing n-k trajectory modification requests (where k is an integer greater than or equal to 1 but less than n), wherein each of the sets contains all of the n trajectory modification requests except for k of the n trajectory modification requests and the k trajectory modification request(s) is/are different for each of the sets;
processing each of the sets by tentatively granting all of the n-k trajectory modification requests thereof to identify one or more non-conflicting sets in which granting of the n-k trajectory modification requests thereof would not pose a conflict with the altitudes, speeds and lateral routes of the multiple aircraft;
if there are at least two of the non-conflicting sets, performing a cost computation to compare relative operational costs associated with granting all of the n-k trajectory modification requests of each of the non-conflicting sets;
identifying one non-conflicting set of the non-conflicting sets as being associated with a lower operational cost than the others of the non-conflicting sets;
granting the n-k trajectory modification requests of the identified non-conflicting set and notifying those of the multiple aircraft that transmitted the n-k trajectory modification requests; and then
removing from the queue the n-k trajectory modification requests of the identified non-conflicting set.

16. The method according to claim 1, further comprising:
transmitting from a second of the multiple aircraft a second trajectory modification request to alter the altitude, speed and/or lateral route of the second aircraft after the first trajectory modification request is transmitted from the first aircraft;
after the steps of performing the first conflict assessment and notifying the first aircraft as to whether or not the first trajectory modification request thereof will be granted, performing a second conflict assessment to determine if the second trajectory modification request of the second aircraft poses a conflict with the altitudes, speeds and lateral routes of any other of the multiple aircraft;
granting the second trajectory modification request and notifying the second aircraft of the second trajectory modification request being granted if a conflict is not identified by the second conflict assessment step, or not granting the second trajectory modification request and notifying the second aircraft of the second trajectory modification request not being granted if a conflict is identified by the second conflict assessment step; and then
if the second trajectory modification request was not granted, placing the second trajectory modification request in the queue, wherein if both of the first and second trajectory modification requests were not granted, the step of periodically processing the queue is performed to determine whether either or both of the first and second trajectory modification requests poses a conflict and can be granted.

17. The method according to claim 1, wherein the method is performed while the multiple aircraft are en route between one or more airports from which the multiple aircraft departed and one or more metering fix points associated with one or more airports at which the multiple aircraft are scheduled to land.

18. A system adapted to negotiate air traffic trajectory modification requests received from multiple aircraft that each has trajectory parameters comprising altitude, speed and lateral route thereof, the method comprising:
means for monitoring the altitudes, speeds and lateral routes of the multiple aircraft;
means for transmitting at least a first trajectory modification request from at least a first of the multiple aircraft to alter the altitude, speed and/or lateral route thereof;
means for performing conflict assessments to determine if the first trajectory modification request transmitted from the first aircraft poses a conflict with the altitudes, speeds and lateral routes of any other of the multiple aircraft;
means for notifying the first aircraft if the first trajectory modification request thereof can be granted on the basis of whether a conflict was identified by the conflict assessments performing means;
a queue in which the first trajectory modification request is placed if the first trajectory modification request cannot be granted on the basis that a conflict was identified by the conflict assessments performing means; and
means for periodically processing the queue to perform subsequent conflict assessments to determine if the first trajectory modification request of the first aircraft still poses a conflict with the altitudes, speeds and lateral routes of any other of the multiple aircraft.

19. The system according to claim 18, wherein the performing means, the queue, and the periodic processing means are components of a computer processing apparatus.

20. The system according to claim 19, wherein the computer processing apparatus further comprises a data storage media for storing and updating the trajectory parameters of the multiple aircraft.

21. The system according to claim 19, wherein an air traffic controller notifies the first aircraft as to whether or not the first trajectory modification request is being granted.

22. The system according to claim 19 wherein the computer processing apparatus is adapted to determine, in the event the first trajectory modification request of the first aircraft is not granted, an alternative trajectory modification characterized by an altitude, speed and/or lateral route that differs from the altitude, speed and/or lateral route of the first trajectory modification request of the first aircraft, perform a second conflict assessment to determine if the alternative trajectory modification poses a conflict with the altitudes, speeds and lateral routes of any other of the multiple aircraft, and, if a conflict is not identified by the second conflict assessment, propose the alternative trajectory modification to the first aircraft.

* * * * *